US011589568B2

(12) United States Patent
Peterson

(10) Patent No.: US 11,589,568 B2
(45) Date of Patent: *Feb. 28, 2023

(54) PORTABLE ORGANIC ENTITY TERMINATION APPLICATOR UNIT

(71) Applicant: WEEDS NEVER SLEEP LLC, Portland, OR (US)

(72) Inventor: Michael Peterson, Portland, OR (US)

(73) Assignee: WEEDS NEVER SLEEP LLC, Portland, OR (US)

( * ) Notice: Subject to any disclaimer, the term of this patent is extended or adjusted under 35 U.S.C. 154(b) by 570 days.

This patent is subject to a terminal disclaimer.

(21) Appl. No.: 16/664,740

(22) Filed: Oct. 25, 2019

(65) Prior Publication Data

US 2020/0053999 A1 Feb. 20, 2020

Related U.S. Application Data

(63) Continuation-in-part of application No. 15/596,433, filed on May 16, 2017, now abandoned, which is a continuation-in-part of application No. 13/970,470, filed on Aug. 19, 2013, now Pat. No. 9,681,653.

(60) Provisional application No. 61/691,764, filed on Aug. 21, 2012.

(51) Int. Cl.
*A01M 21/04* (2006.01)
*A01M 7/00* (2006.01)
*A01M 21/00* (2006.01)

(52) U.S. Cl.
CPC ........ *A01M 7/0017* (2013.01); *A01M 7/0046* (2013.01); *A01M 21/00* (2013.01); *A01M 21/04* (2013.01); *A01M 21/043* (2013.01)

(58) Field of Classification Search
CPC ..... A01M 21/00; A01M 21/04; A01M 21/043
USPC ..................... 47/1.5, 57.7; 43/129
See application file for complete search history.

(56) References Cited

U.S. PATENT DOCUMENTS

| 2,605,137 | A | 7/1952 | Ofeldt |
| 4,272,920 | A | 6/1981 | Dawson |
| 4,357,779 | A | 11/1982 | Maddock |
| 4,409,755 | A | 10/1983 | Maddock |
| 4,748,769 | A | 6/1988 | Kolskog et al. |
| 4,899,488 | A | 2/1990 | Faulkner |
| 5,297,730 | A | 3/1994 | Thompson |

(Continued)

FOREIGN PATENT DOCUMENTS

| CA | 2104760 A1 | 2/1994 |
| CA | 2197093 A1 | 2/1996 |

(Continued)

*Primary Examiner* — David J Parsley
(74) *Attorney, Agent, or Firm* — Renaissance IP Law Group, LLP; David A. Crowther

(57) ABSTRACT

Embodiments of the inventive concept provide a portable organic entity termination applicator unit. The applicator unit can include an organic herbicide reservoir or can otherwise be an herbicideless applicator unit. The applicator unit can include an outer housing, a cold water supply line, an organic herbicide reservoir to hold organic herbicide, an herbicide adjustment valve for controlling a liquid mixture, a heater core to pre-heat the herbicide water liquid mixture, and a delivery pipe to expel the heated liquid. The applicator unit can include a fuel canister receptacle to receive a fuel canister. The heater core may heat the liquid using fuel stored in the fuel canister.

19 Claims, 15 Drawing Sheets

(56) References Cited

U.S. PATENT DOCUMENTS

| | | | |
|---|---|---|---|
| 5,385,106 A | 1/1995 | Langshaw | |
| 5,430,970 A | 7/1995 | Thompson et al. | |
| 5,527,366 A | 6/1996 | Mazurkiewicz | |
| 5,575,111 A | 11/1996 | Rajamannan | |
| 5,822,968 A | 10/1998 | Savala | |
| 5,866,058 A | 2/1999 | Batchelder et al. | |
| 5,870,852 A | 2/1999 | Stanley | |
| 5,946,851 A | 9/1999 | Adey et al. | |
| 6,029,589 A | 2/2000 | Simpson | |
| 6,047,495 A | 4/2000 | Matsumura et al. | |
| 6,047,900 A | 4/2000 | Newson et al. | |
| 6,321,037 B1 | 11/2001 | Reid et al. | |
| 6,367,714 B1 | 4/2002 | Smoot | |
| 6,505,437 B1 | 1/2003 | Johnstone et al. | |
| 6,634,435 B2 | 10/2003 | Saeger | |
| 7,100,540 B2 | 9/2006 | Vaughan | |
| 7,190,890 B2 | 3/2007 | Higham et al. | |
| 7,654,470 B2 | 2/2010 | Crosswell | |
| 8,544,178 B2 | 10/2013 | Smiley | |
| 8,720,109 B2 * | 5/2014 | O'Brien | F25B 49/022 43/132.1 |
| 8,740,109 B2 | 6/2014 | Muston et al. | |
| 9,681,653 B2 * | 6/2017 | Peterson | A01M 21/043 |
| 9,756,843 B2 * | 9/2017 | Leach | A01M 21/04 |
| 2003/0136048 A1 | 7/2003 | Newson | |
| 2007/0176316 A1 | 8/2007 | Musten et al. | |
| 2012/0216445 A1 | 8/2012 | Aquilina | |

FOREIGN PATENT DOCUMENTS

| | | |
|---|---|---|
| EP | 0920802 A1 | 6/1999 |
| EP | 1186234 B1 | 8/2005 |
| EP | 1450603 B1 | 6/2009 |
| WO | 1994026102 A1 | 11/1994 |
| WO | 9529767 A1 | 4/1995 |
| WO | 0078519 | 12/2000 |
| WO | 2005060744 A1 | 7/2005 |

* cited by examiner

PORTABLE ORGANIC ENTITY TERMINATION APPLICATOR UNIT

RELATED APPLICATION DATA

This application is a continuation-in-part of copending, commonly-owned U.S. patent application Ser. No. 15/596,433, filed May 16, 2017, which is a continuation-in-part of commonly-owned U.S. patent application Ser. No. 13/970,470, filed Aug. 19, 2013, which claims the benefit of commonly-owned U.S. provisional patent application Ser. No. 61/691,764, filed Aug. 21, 2012, which are hereby incorporated by reference.

TECHNICAL FIELD

Embodiments herein relate to a portable applicator for killing organic entities such as plants and weeds, or animals such as slugs and snails.

BACKGROUND

Current applicators for killing weeds, slugs or snails may suffer from significant drawbacks. For example, applicators may be bulky and require heavy backpacks or rollers to transport them effectively. This bulk may make the applicators impracticable to transport over uneven ground such as a grassy area. Alternatively, use of the applicators may be time consuming because plants may require an extended application from the applicators.

Accordingly, a need remains for improved applicator and methods for killing unwanted plants or pests. Embodiments of the inventive concept address these and other limitations in the prior art.

Figure 1:
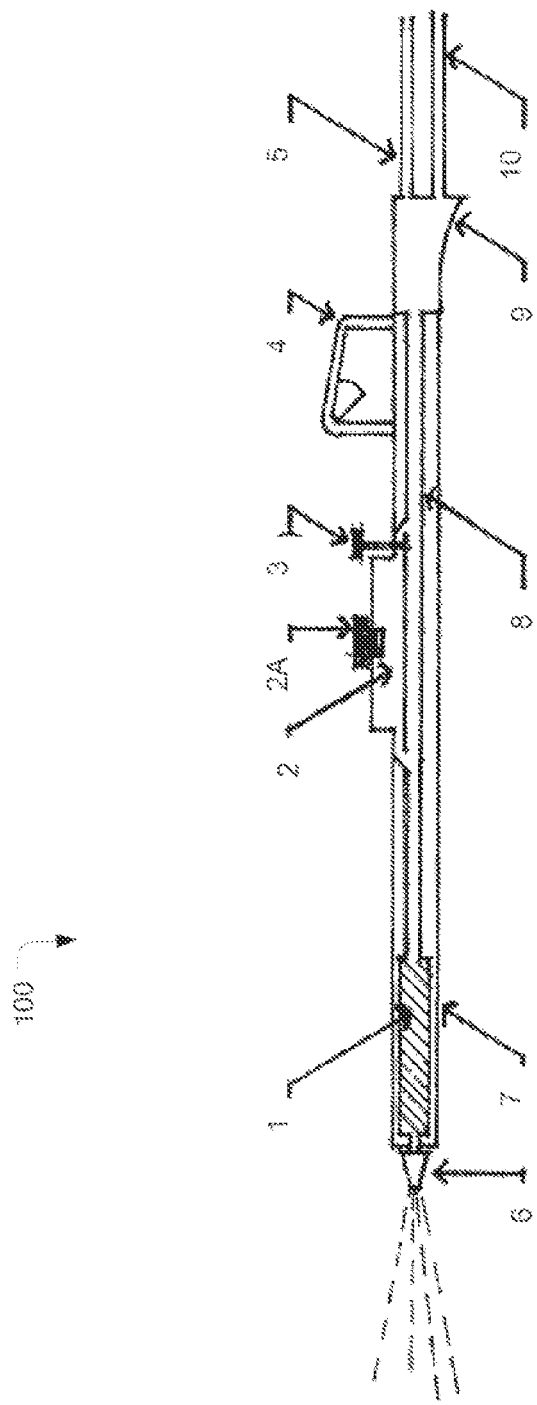
FIG. 1 illustrates a cross-sectional mid-sagittal view of an example of an applicator, in accordance with various embodiments.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first applicator could be termed a second applicator, and, similarly, a second applicator could be termed a first applicator, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description may use perspective-based descriptions such as up/down, back/front, and top/bottom. Such descriptions are merely used to facilitate the discussion and are not intended to restrict the application of disclosed embodiments.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

Embodiments herein provide an organic herbicide applicator. In some embodiments, the applicator may include one or both of the features of a pressurized and/or heated stream of liquid. For example, in some embodiments the applicator may expel liquid at a pressure at or above 250 pounds per square inch. Additionally or alternatively, the liquid may be heated to a temperature at or above 150 degrees Fahrenheit. In other embodiments a lower or higher temperature may be used.

In some embodiments the liquid expelled may only include water, while other embodiments may use a chemical or an organic herbicide such as organic acids, simple sugars, surfactants, ammonia, fertilizer, or some other chemical or organic herbicide mixed with the water. In some embodiments, the chemical may be a chemical that is optimized to kill something other than plants, for examples slugs and/or snails. Hereinafter the term "liquid" will be used but may be understood to refer to water, herbicide, or a water/herbicide mixture, unless otherwise specifically noted.

This combination of pressurized and heated liquid may boost the efficacy of the applicator to maximize lethality to plants, slugs, or snails. Specifically, with respect to plants, herbicides may generally penetrate the cellular structure of a plant to kill the plant. A stream of pressurized and heated liquid may be more effective because the pressure and/or heat may aid the liquid in bursting the cells on the surface of a plant, thereby allowing the liquid to more quickly penetrate into deeper layers of the plant. Therefore, less liquid, for example less herbicide, may be required for a lethal dose of the liquid to be delivered to the plant.

The use of a directable and pressurized jet of liquid from the applicator may provide an additional benefit in that one or more of plant roots, tall plants, vertical surfaces, and confined spaces may also be targeted. Specifically, the applicator may be directable such that a pressurized jet of liquid may deliver the liquid to multiple different areas of the plant. For example, in one embodiment the pressurized jet of liquid may be applied to the root of the plant.

In an alternative embodiment, the applicator may be directed or re-directed such that the liquid may be delivered to a foliar, or above ground, portion of the plant. For example, in this embodiment the liquid may be delivered to one or more of the leaves, stems, branches, or trunk of the plant.

In some embodiments, the applicator may expel the liquid at a pressure at or above 250 pounds per square inch. In the embodiment described above where the liquid is directed to the roots of a plant, a direct application of a jet of the pressurized liquid at this pressure may be sufficient to penetrate soil and reach the roots of the plant. In other embodiments, the applicator may expel the liquid at a greater or lesser pressure, such as, but not limited to, between 100 and 500 pounds per square inch. In some embodiments, a lower or higher pressure may be used to deliver a sufficient application/dose of liquid to a plant.

FIG. 1 shows an embodiment of the applicator 100. The applicator 100 may include an inline heating unit 1 configured to heat the liquid being expelled from the applicator 100. The inline heating unit 1 may be coupled with an herbicide chamber 2 which may include an herbicide chamber lid 2A. In this embodiment, liquid may be able to flow from the herbicide chamber 2 through the inline heating unit 1 before it is expelled from the applicator 100.

The herbicide chamber 2 may further contain a valve 3 that may be actuated to control whether liquid is allowed to enter the herbicide chamber 2 and mix with herbicide before the liquid is expelled from the applicator 100. In this manner, a user may actuate valve 3 to control whether only water or water mixed with herbicide are expelled from the applicator 100.

In some embodiments, the valve 3 may be a simple valve that is either fully open or fully shut, or the valve 3 may allow for being only partially open such that the user may variably control the amount of herbicide in the water dependent on the user's preference or application. In other embodiments, more than one valve may be used.

The applicator 100 may also include a handle and trigger assembly 4. The handle and trigger assembly may be coupled with another valve (not shown) in the applicator 100 such that a user may depress the trigger to allow water to flow through the applicator 100 into the herbicide chamber 2 and be forcibly expelled from the applicator. The water may be fed into the applicator from a water supply line 5 that is placed between a water supply source (not shown) and the valve controlled by the handle and trigger assembly 4. FIG. 1 shows the water line 8 that connects the water supply line 5 and the handle and trigger assembly 4. In some embodiments, the user may depress the handle and trigger assembly 4 to open the valve (not shown) such that water flows from the water supply line 5 into the water line 8.

Although in FIG. 1 the handle and trigger assembly 4 are shown as part of a top portion of the applicator 100, in other embodiments the handle and trigger may be on a side or bottom portion of the applicator 100. In some embodiments, the handle and trigger may be separate from one another.

The applicator 100 may further include a spray tip 6 that may be used to expel the water from the applicator 100. In some embodiments, the spray tip 6 may be adjustable such that certain characteristics of the liquid exiting the applicator 100 may be altered. For example, the distance, width, or shape of the spray exiting the applicator 100 through spray tip 6 may be changed by adjusting spray tip 6, such as by swapping the tip for an alternate tip or rotating the tip to align certain dispensing holes and/or to adjust the dispensing aperture. In other embodiments, spray tip 6 may not be adjustable. As shown in FIG. 1, the inline heating unit 1 may be generally located between the spray tip 6 and the herbicide chamber 2. In some embodiments, the inline heating unit 1 may receive the liquid, heat the liquid and provide the heated liquid directly to spray tip 6. Locating inline heating unit 1 relatively close to spray tip 6 may provide the advantage of limiting heat loss which may otherwise occur if, for example, inline heating unit 1 were located further upstream, such as prior to herbicide chamber 2.

The inline heating unit 1 may or may not be surrounded by some form of an insulated jacket 7. In some embodiments, the insulated jacket 7 may be made of any soft or hard insulating material such as a vacuum chamber, NBR/PE rubber foam, ceramic fiber, or some other insulating material. In other embodiments, the applicator 100 may not have the insulated jacket 7. In yet other embodiments, the insulated jacket 7 may be an internal element of the inline heating unit 1.

FIG. 1 further shows that the water line 8 may connect the water supply 5, the handle and trigger assembly 4, the herbicide chamber 2 and the inline heating unit 1. In operation, the user may depress the handle and trigger assembly 4 such that water may flow from the water supply line 5 through the water line 8. The water may or may not mix with herbicide from the herbicide chamber 2, depending on the position of valve 3. The water/herbicide mixture may then re-enter water line 8 before entering inline heating unit 1 where the pressurized liquid is heated and expelled from the applicator 100 via spray tip 6.

In some embodiments of the applicator 100, the applicator 100 may include a pump 9 connected to the water supply line 5. The pump 9 may be configured to do one or both of drawing water from the water supply line 5 and into the water line 8, and/or pressurizing the liquid in the water line 8 as discussed above. In other embodiments, the water line 8 and/or liquid may be pressurized from an outside source, or the water line 8 and/or liquid may be pressurized by a pump that is separate from the applicator 100. The pump may be powered by a power supply 10. The power supply may be provided via an electric cord, a battery, or some other form of power supply. In some embodiments, the pump 9 may be located in a location different than that shown in FIG. 1. In some embodiments, there may be a plurality of pumps such as pump 9, wherein a first pump is located prior to the herbicide chamber 2, e.g. between the herbicide chamber 2 and the water supply line 5 as shown in FIG. 1, while a second pump may be located generally between the herbicide chamber 2 and the inline heating unit 1. In other embodiments, one or more pumps may be located in additional or alternative locations of the applicator 100. V The above described applicator 100 may realize a number of significant benefits. For example, by having the inline heating unit 1 close to the spray tip 6, for example as the last element in the flow of the liquid through the applicator 100, the liquid may exit the applicator 100 without incurring significant heat loss. Additionally, the liquid may be expelled from the applicator 100 due to pressurization by the pump 9. The expulsion of the liquid due to pressurization by the pump 9, rather than for example flash heating by the inline heating unit 1, may have the benefit of expelling the water as liquid rather than a gas such as steam. The pressurized, heated, expelled liquid, which may or may not contain organic herbicide, may more significantly damage plants, slugs or snails, than if the liquid was expelled as, for example, steam.

Finally, the use of an organic herbicide such as ammonia, organic acids, simple sugars, or surfactants may result in significant benefits. For example, in-organic herbicides may break down and become ineffective when heated. Additionally, the in-organic herbicides may congeal or otherwise change consistency when they are heated so that blockages or part wear inside the applicator 100 may occur. By using an organic herbicide, the liquid may be less likely to change consistency or break down once it is heated and/or pressurized.

Figure 4:
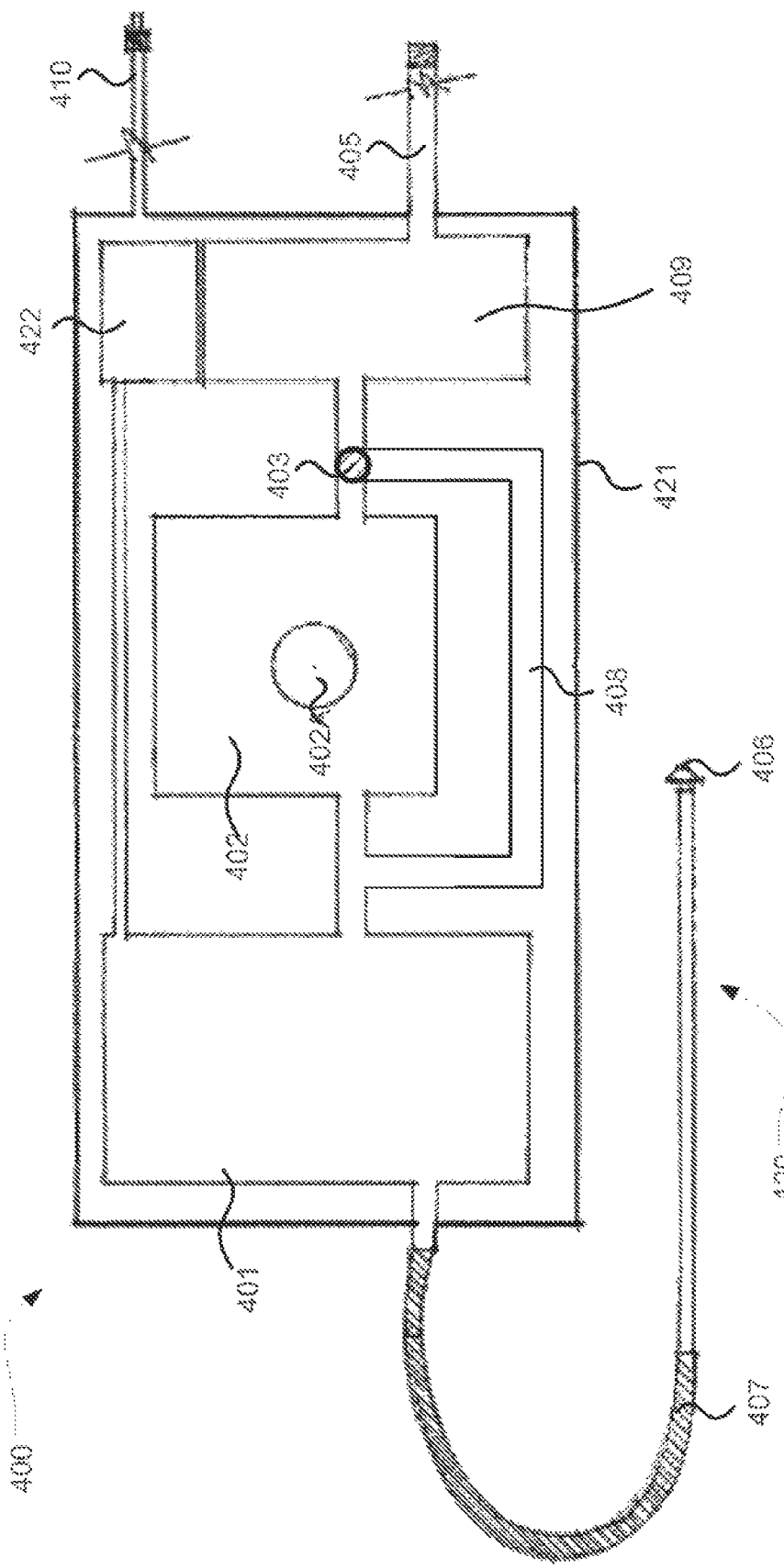
FIG. 4 illustrates an alternative example of an applicator, in accordance with various embodiments.

FIG. 4 depicts an alternative embodiment of an applicator 400. Similarly numbered elements may be similar to the elements of applicator 100 depicted in FIG. 1. Specifically, the applicator 400 may include an inline heating unit 401, which may be similar to inline heating unit 1, configured to heat liquid in the applicator 400. The liquid may be expelled from the inline heating unit 401 through a hose with an insulated jacket 407, and ultimately expelled from a Spray tip 406 at the end of a wand 420. In some embodiments, the hose within the insulated jacket 407 may be flexible such that the spray tip 406 may be easily directable by a user holding the wand 420. The insulated jacket 407 may be similar to insulated jacket 7, and spray tip 406 may be similar to spray tip 6.

Similarly to the applicator 100, the applicator 400 may further include a pump 409 coupled with a water supply line 405. Similarly to the water supply line 105 described above, the water supply line 405 may be coupled with a backpack, a hose, or some other type of water supply (not shown). The pump 409 may be configured to pressurize liquid from the water supply 405 through a water line 408. In some embodiments, the applicator 400 may include a valve 403 that may be similar to valve 3 discussed above. The valve 403 may be configurable by a user to be open, partially open, or shut. If the valve 403 is open or partially open, then pressurized liquid may flow from the pump 409 into herbicide chamber 402. Herbicide chamber 402 may include an herbicide chamber lid 402A through which a user may pour organic herbicide into the herbicide chamber 402. Similarly to applicator 100, the pressurized liquid may flow from one or both of the water line 408 and/or the herbicide chamber 402 in the inline heating unit 401. The pressurized liquid may include one or both of herbicide and water. Finally, a switch 422 may be coupled with the inline heating unit 401 and configured to activate or deactivate one or more of the inline heating unit 401, the pump 409, or the applicator 400 as a whole.

One or all of inline heating unit 401, herbicide chamber 402, water line 408, valve 403, switch 422, and pump 409 may be included within an applicator body 421 which in some cases may be metal or plastic. In some cases, the applicator body 421 may have a form factor small enough to be easily portable. For example, in some cases, the applicator body 421 may be approximately six inches high and twelve inches long, though in other embodiments the applicator body 421 may have larger or smaller measurements.

In some embodiments, as described above, the pump 409 may be located generally between the inline heating unit 401 and the herbicide chamber 402. In some embodiments, the applicator 400 may include a plurality of pumps such as pump 409 located between the herbicide chamber 402 and the water supply line 405, and then a second pump located generally between the inline heating unit 401 and the herbicide chamber 402. In other embodiments, one or more pumps may be located in additional or alternatives locations of the applicator 400.

Applicator 400 may share many of the same benefits of applicator 100. For example, by having the inline heating unit 401 relatively close to the wand 420, or as the last element in the flow of the liquid through the applicator 400, heat loss of the liquid may be minimized or avoided. Additionally, by pressurizing the applicator 400 using the pump 409 rather than the inline heating unit 401, the liquid may be expelled from the spray tip 406 as a liquid rather than a gas like steam. Finally, the use of an organic herbicide may minimize breakdown of the herbicide and/or damage to parts of the applicator 400.

Figure 5:
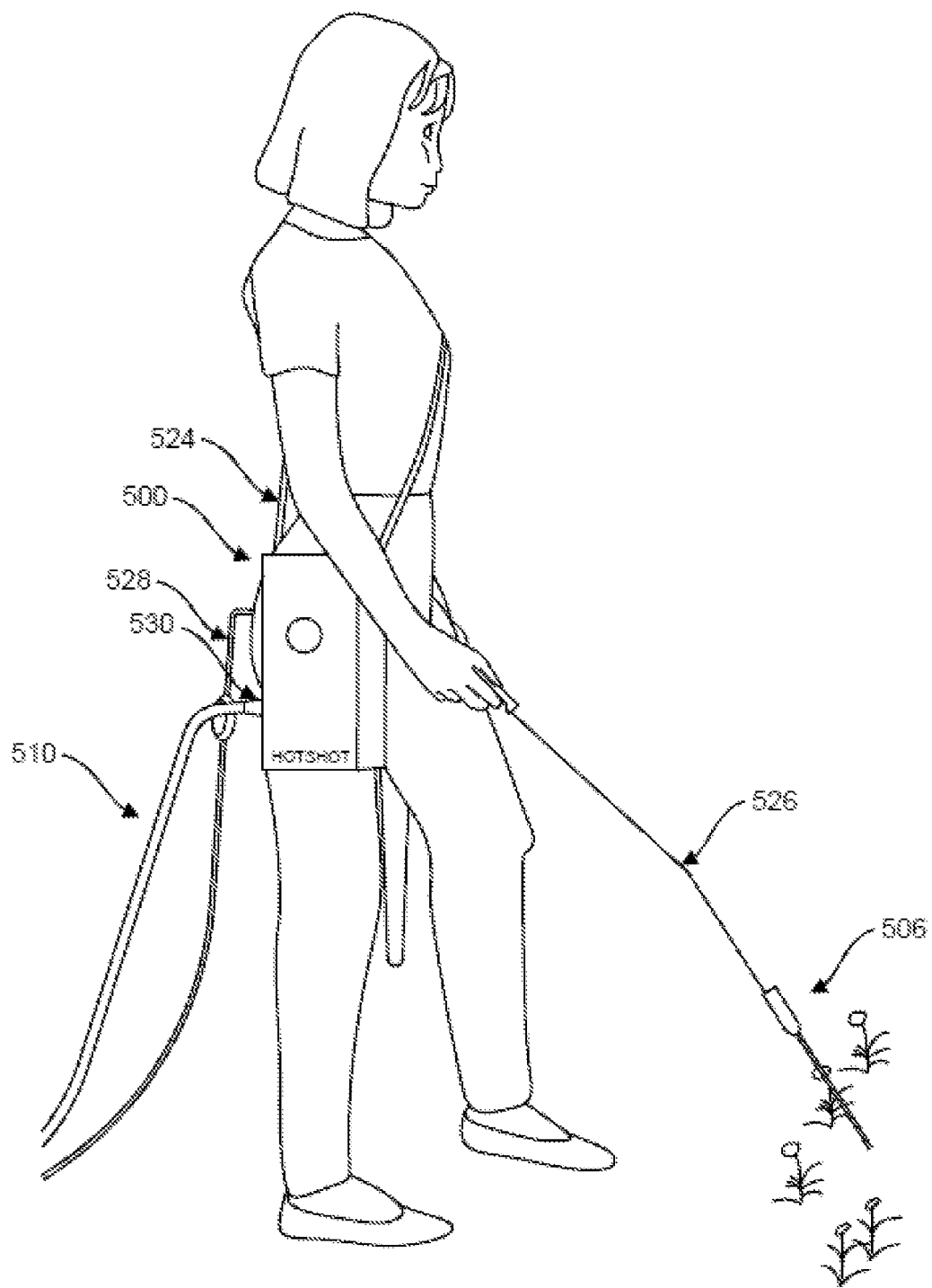
FIG. 5 depicts an example of a user using an applicator, in accordance with various embodiments.

FIG. 5 depicts an example of a user using a body worn applicator 500 including a strap 524. The applicator 500 may be similar to applicator 400 and include a hand held wand 526 including a spray tip 506 which may be similar to spray tip 406. The applicator 500 may be coupled with one or both of an electrical line 515 with an electric connector 528 and a water line 510 with a water line connector 530. In other embodiments, not shown, the applicator 500 may be coupled with a battery or a different source of water, e. g. a backpack.

Figure 2:
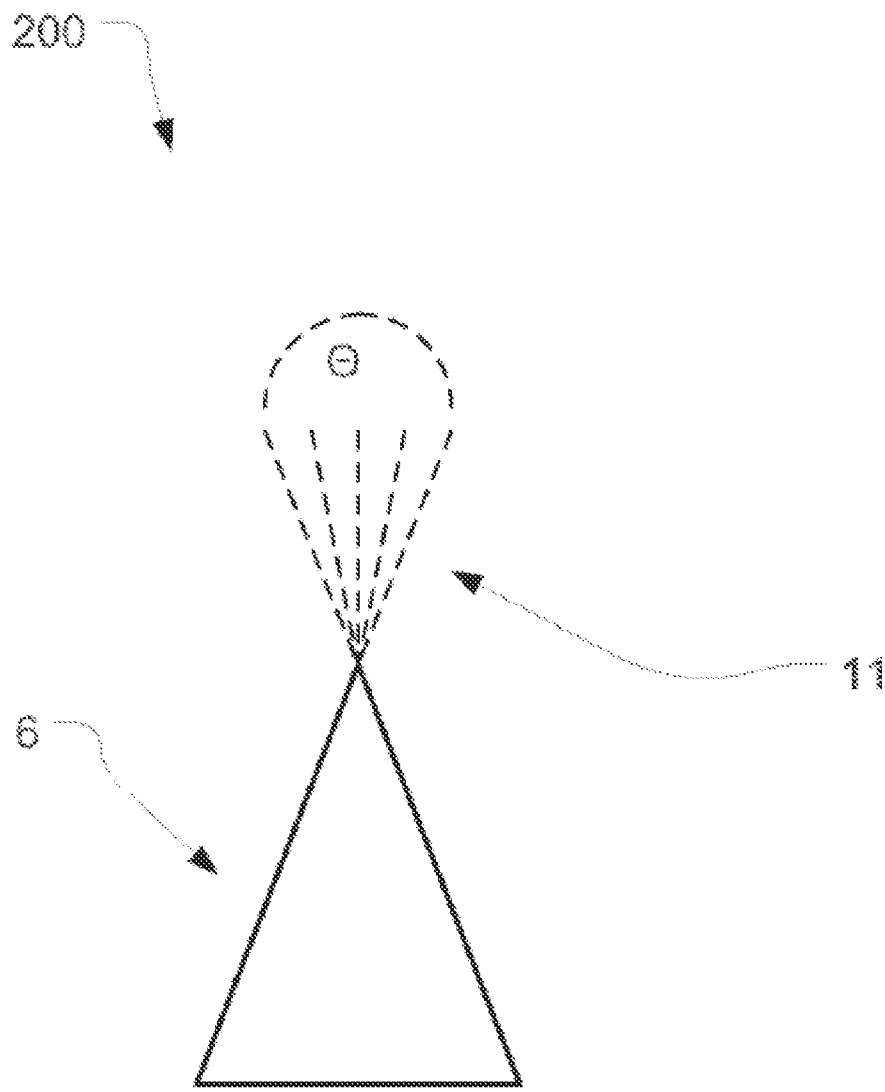
FIG. 2 illustrates an example spray pattern of an applicator, in accordance with various embodiments.
Figure 3:
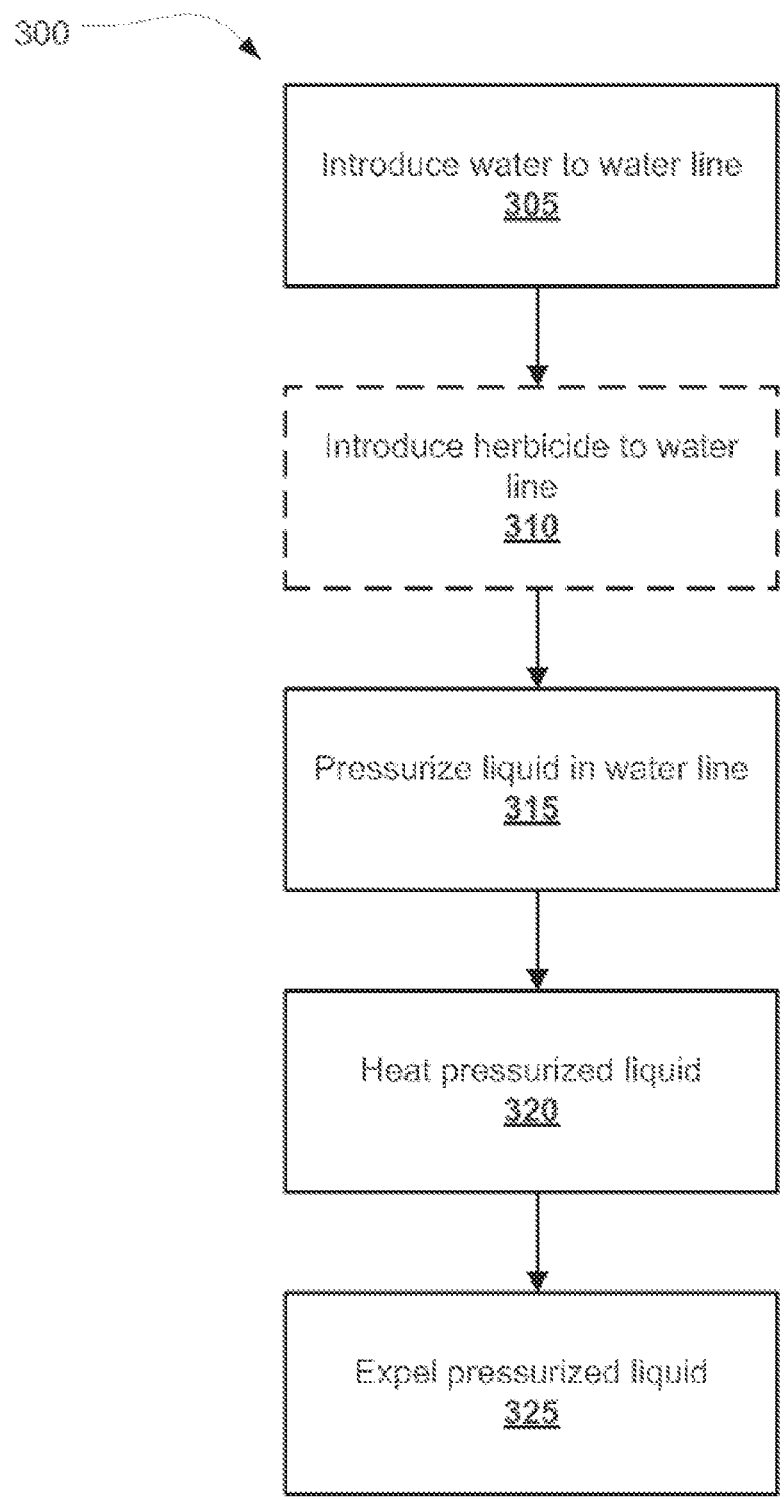
FIG. 3 illustrates an example method of using the applicator, in accordance with various embodiments.

FIG. 2 shows an example 200 of the liquid being expelled from the spray tip 6 of the applicator 100, or spray tip 406 of the applicator 400. The liquid may exit the spray tip 6 or 406 in a spray 11 with an angle Θ. In one embodiment, the angle Θ of the spray 11 can be one degree. In other embodiments the angle Θ of the spray 11 can be less than one degree, or as high as ten degrees.

In some embodiments, a wider angle Θ of the spray 11 may allow the water to penetrate a greater portion of the above-ground parts of the plant such as the stems, branches, trunk and leaves of the plant. In other embodiments, a narrow angle Θ of the spray 11 may increase the pressure of the expelled liquid, thereby allowing the liquid to burst the cells of the above-ground parts of the plant, which may increase the lethality of the sprayed liquid. Alternatively, the narrow angle Θ of the spray 11 may allow the spray to penetrate the ground or soil and reach the roots of a plant, allowing for greater effectiveness in fatally damaging the plant.

As noted above, in some embodiments the spray tip 6 or 406 may be variable such that the user may be able to adjust the angle of the spray 11. In other embodiments, the spray tip 6 or 406 may not be variable and may instead be set at a specific, unadjustable angle. In some embodiments, the applicator 100 may be compatible with a plurality of different spray tips which may have different patterns or configurations. For example, in some embodiments the spray tip 6 or 406 may be directed in a generally fan-shaped spray. In other embodiments, the spray may be directed in a generally conically shaped spray. In some embodiments the spray tip may have a plurality of points which the liquid is expelled from so that the spray tip 6 or 406 may include a plurality of distinct streams. Other combinations or configurations may likewise be used with the applicator 100 or 400.

FIG. 3 depicts an example process 300 of using the applicator 100 or 400 according to various embodiments. In some embodiments, water may be introduced to a water line such as water line 8 or 408 of applicators 100 or 400, respectively, at 305. For example, as described above, the water may be introduced to water line 8 or 408 from the water supply line 5 or 405.

Next, herbicide may optionally be introduced from the herbicide chamber 2 or 402 to the water line 8 or 408 at 310, as described above. In other embodiments, the herbicide may not be introduced to the water line 8 or 408. As noted above, the introduction of the herbicide from the herbicide chamber 2 or 402 to the water line 8 or 408 may be dependent upon actuation of the valve 3 or 403.

The liquid in the water line 8 or 408 may then be pressurized at 315. For example, the pump 9 or 409 may pressurize the liquid in the water line 8 or 408. As described above, in some embodiments the applicator 100 or 400 may include a plurality of pumps such as a pump between the water supply 5 or 405 and the herbicide chamber 2 or 402, as well as a pump between the herbicide chamber 2 or 402 and the inline heating unit 1 or 401. In some embodiments, one or more of element 305, 310, and 315 may occur simultaneously or sequentially. For example, in some embodiments, element 315 may occur before or at the same time as one or both of elements 305 or 310.

The pressurized liquid may then be heated at 320. For example, the pressurized liquid in the water line 8 or 408 may be heated by the inline heating unit 1 or 401. Finally, the pressurized heated liquid may be expelled from the spray tip 6 or 406 at 325.

FIG. 6 illustrates an example hip-worn applicator unit 600, in accordance with various embodiments. The hip-worn applicator unit 600 can include a shoulder strap 605 attached to an outer housing 610. The shoulder strap 605 can be adjustable so that persons of any stature can comfortably wear and carry the hip-worn applicator unit 600 near their hip. The outer housing 610 can include a removable cover 615 on at least one side thereof to provide easy access to internal components of the hip-worn applicator unit 600.

The hip-worn applicator unit 600 can include or otherwise receive a cold water supply line 620 at a water inlet 622 of the hip-worn applicator unit 600. The cold water supply line 620 can be, for example, a hose. The cold water supply line 620 can be attached to the outer housing 610. The cold water supply line 620 can be coupled to a first internal water line 625, which can be coupled to a water shutoff valve 630. The water shut off valve 630 can be controlled by the user. In other words, the user can control whether water is flowing through the hip-worn applicator unit 600 by either turning on or off the water shut off valve 630.

The water shut off valve 630 can be coupled to a second internal water line 632, which itself is coupled to an herbicide adjustment valve 634. The herbicide adjustment valve 634 can include a knob 636. The herbicide adjustment valve 634 can be coupled to an organic herbicide reservoir 640 via a third internal water line 638. The knob 636 provides the user with the ability to adjust the amount of water traveling from the second internal water line 632 to the third internal water line 638 to be mixed with herbicide stored in the organic herbicide reservoir 640. It will be understood that instead of a knob, a lever, a slider, or other suitable adjusting means can be used. The herbicide adjustment valve 634 can adjust whether and how much water flows through the third internal water line 638 for mixing with herbicide stored in the organic herbicide reservoir 640. It will also be understood that other chemicals may be stored in the organic herbicide reservoir 640 besides herbicide, or in addition to herbicide, such as fertilizer or other suitable mixtures of chemicals.

The organic herbicide reservoir 640 can be completely bypassed using the knob 636. For example, the knob 636 can cause the herbicide adjustment valve 634 to force all water coming from the second internal water line 632 to a water bypass supply line 642. The water bypass supply line 642 can transmit the bypass water to a heater core 644. Alternatively, when the herbicide adjustment valve 634 is not configured to bypass the organic herbicide reservoir 640, the water and herbicide mixture can exit the organic herbicide reservoir 640 via an herbicide mixture supply line 646.

In some embodiments, some water can be transmitted via the water bypass supply line 642 while some water and herbicide mixture can be transmitted via the herbicide mixture supply line 646. In an alternative embodiment, water can be transmitted via the water bypass supply line 642 while no water and herbicide mixture is transmitted via the herbicide mixture supply line 646. In yet another alternative embodiment, no water is transmitted via the water bypass supply line 642 while the water and herbicide mixture can be transmitted via the herbicide mixture supply line 646.

The quantity of each amount of liquid being transmitted via the water bypass supply line 642 and the herbicide mixture supply line 646 can be controlled using the knob 636. Any water being transmitted via the water bypass supply line 642, and any water and herbicide mixture supply being transmitted via the line 646, can meet and travel through a T fitting 648, which can join the two streams of liquid into a single stream. The mixture of liquids can be in a pressurized state due to pressure from the cold water supply. The pressurized water liquid and/or water and herbicide liquid mixture can be transmitted through a combined liquid line 650.

The organic herbicide reservoir 640 can include a reservoir access cap 670. Herbicide can be refilled via the reservoir access cap 670. The hip-worn applicator unit 600 can include the heater core 644. The combined liquid line 650 can be coupled to the heater core 644. The heater core 644 can pre-heat the liquid. The heater core 644 can be coupled to a heated liquid supply line 652.

The hip-worn applicator unit 600 can include an electrical on/off switch 654 and a power supply line 656. The electrical on/off switch 654 can prevent or cause electrical current to flow from the power supply line 656 to the various components within the hip-worn applicator unit 600 that need power to operate, such as the heater core 644, an electronics control module 658, the herbicide adjustment valve 634, and/or a wand control and power supply line 660. It will be understood that for the sake of simplicity in illustration, all of the various internal electrical wires and connections are not shown. The electronics control module 658 can control a heat level of the heater core 644 and other functions of a wand, such as flash heating, as further described below. The heated liquid supply line 652 and the wand control and power supply line 660 can be coupled to a hand-held wand, as further described below.

Figure 7:
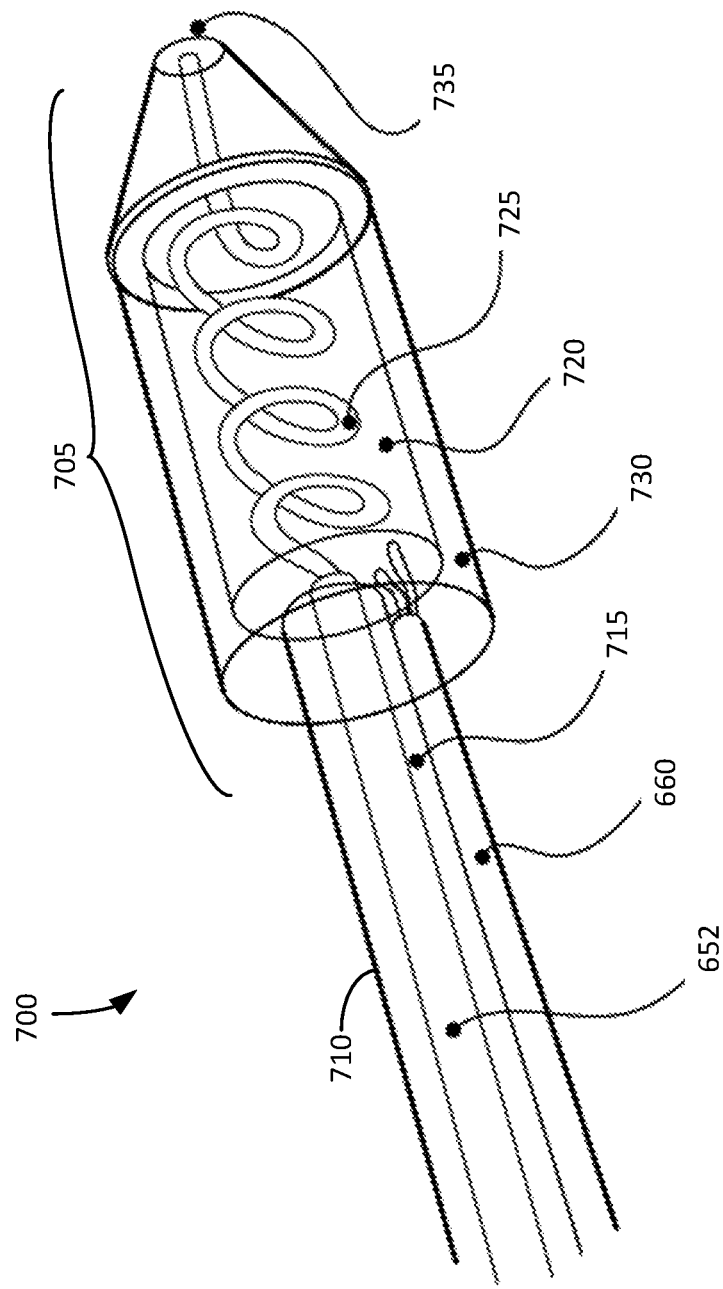
FIG. 7 illustrates an example wand and wand flash heater, in accordance with various embodiments.

FIG. 7 illustrates an example wand 700 and wand flash heater 705, in accordance with various embodiments. The wand 700 can include the wand flash heater 705. The wand 700 can include a rigid outer shell 710 made of metal, plastic, composite material, or any other suitable rigid material. In some embodiments, the rigid outer shell 710 forms a hollow cylinder. The wand 700 can include the heated liquid supply line 652. The heated liquid supply line 652 can be disposed through the hollow cylinder of the rigid outer shell 710. The wand 700 can include the wand control and power supply line 660. In some embodiments, the wand control and power supply line 660 is disposed adjacent to an outside of the hollow cylinder of the rigid outer shell 710. In some embodiments, the wand control and power supply line 660 is disposed within the hollow cylinder of the rigid outer shell 710.

In some embodiments, insulation 715 is disposed within the hollow cylinder of the rigid outer shell 710, surrounding the heated liquid supply line 652. The insulation 715 can insulate the heated liquid supply line 652, thereby reducing heat loss from the pre-heated liquid flowing through the liquid supply line 652.

The wand flash heater 705 can include a flash heater core body 720, an internal heated liquid channel coil 725 through which the liquid travels, an insulated flash heater core housing and insulation 730, and a spray orifice 735. The wand control and power supply line 660 can cause the internal heated liquid channel coil 725 to be heated. The internal heated liquid channel coil 725 can receive the pre-heated liquid through the heated liquid supply line 652 and further heat the liquid prior to being expelled as a single jet through the spray orifice 735. The liquid may be heated to a temperature at or above 150 degrees Fahrenheit prior to exiting the spray orifice 735. In other embodiments a lower or higher temperature may be used. The wand control and power supply line 660 can control the temperature to which the liquid is finally heated.

Figure 6:
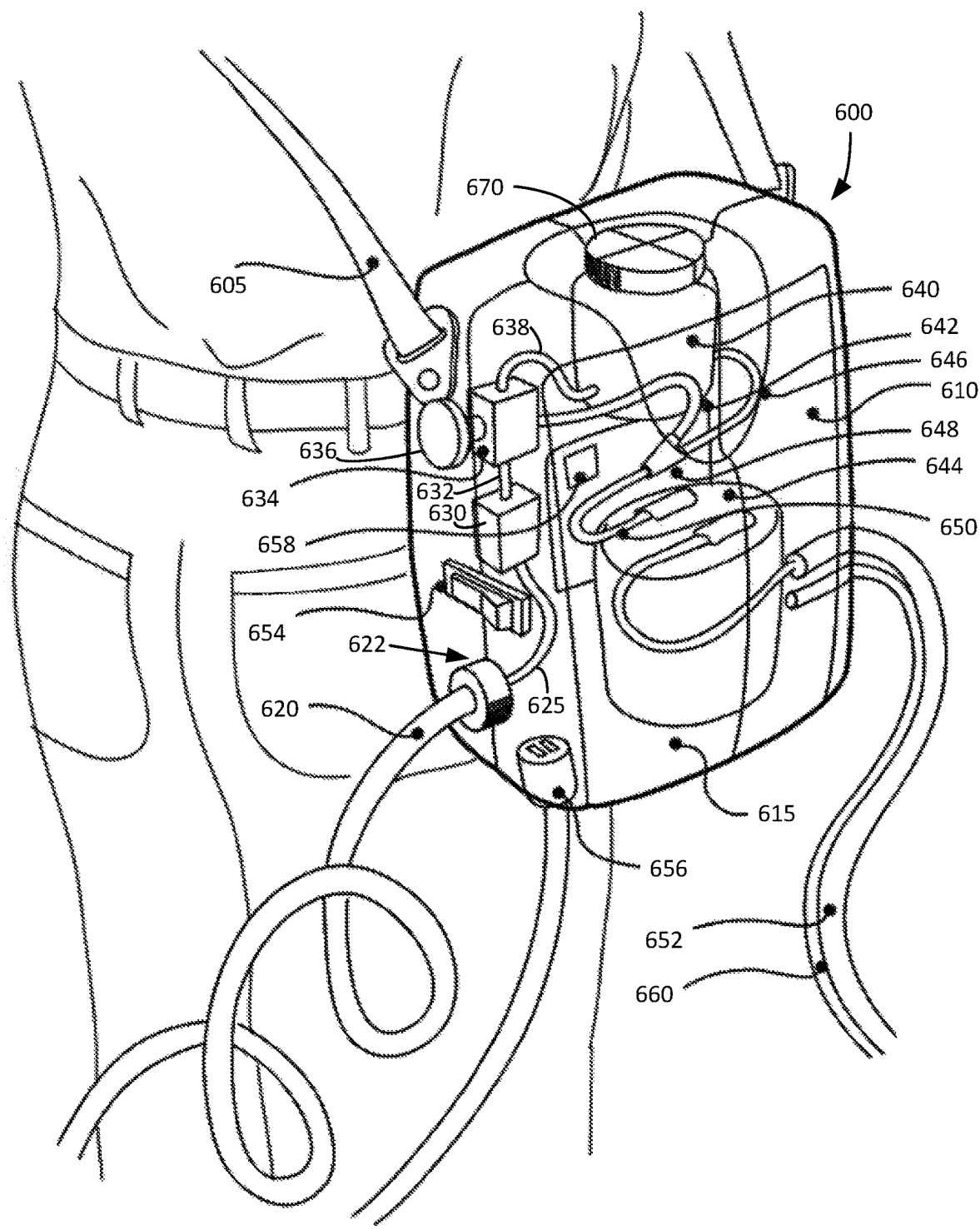
FIG. 6 illustrates an example hip-worn applicator unit, in accordance with various embodiments.

Reference is now made to FIGS. 6 and 7. In some embodiments, a portable hip-warn organic entity termination applicator unit 600 includes an outer housing 610 including a removable cover 615. The portable hip-warn organic entity termination applicator unit 600 can include an adjustable shoulder strap 605 coupled to the outer housing 610 and configured to hold the outer housing 610 at about a hip-level of a user. In some embodiments, a water inlet 622 is configured to receive a cold water supply line 620. The portable hip-warn organic entity termination applicator unit 600 can include an organic herbicide reservoir 640 configured to hold organic herbicide. The portable hip-warn organic entity termination applicator unit 600 can include an herbicide adjustment valve 634 configured to adjust an amount of water received from the cold water supply line 620 to be mixed with the organic herbicide held in the organic herbicide reservoir 640 to produce an herbicide water liquid mixture.

The portable hip-warn organic entity termination applicator unit 600 can include a heater core 644 configured to pre-heat the herbicide water liquid mixture. The portable hip-warn organic entity termination applicator unit 600 can include a flexible insulated heated liquid supply line 652 coupled to the heater core 644 and configured to receive the pre-heated herbicide water liquid mixture. The portable hip-warn organic entity termination applicator unit 600 can include a rigid hand-holdable wand 700 coupled to a terminal end of the flexible insulated heated liquid supply line 652. In some embodiments, the rigid hand-holdable wand 700 includes a hollow interior configured to transmit the pre-heated herbicide water liquid mixture through the hollow interior, and eject the pre-heated herbicide water liquid mixture out of a terminal end of the rigid hand-holdable wand 700.

The portable hip-warn organic entity termination applicator unit 600 can include a wand flash heater 705 configured to flash-heat the pre-heated herbicide water liquid mixture prior to being ejected out of the terminal end of the rigid hand-holdable wand 700. In some embodiments, the wand flash heater 705 includes a flash heater core body 720 and an internal heated channel coil 725 through which the pre-heated herbicide water liquid mixture travels. In some embodiments, the internal heated channel coil 725 is disposed in the flash heater core body 720. A spray orifice 735 can be disposed at a terminal end of the internal heated channel coil 725. In some embodiments, the spray orifice 735 is configured to eject the pre-heated and flash-heated herbicide water liquid mixture out of the rigid hand-holdable wand 700.

The portable hip-warn organic entity termination applicator unit 600 can include a power supply line 656 coupled to the outer housing 610. The portable hip-warn organic entity termination applicator unit 600 can include an electronics control module 658 configured to receive power from the power supply line 656 and to control a heat level of the heater core 644. The portable hip-warn organic entity termination applicator unit 600 can include an on/off switch 654 configured to prevent or to cause electrical current to flow from the power supply line 656 to the electronics control module 658 and the heater core 644.

The portable hip-warn organic entity termination applicator unit 600 can include a first internal water line 625 coupled to the cold water supply line 620. The portable hip-warn organic entity termination applicator unit 600 can include a water shutoff valve 630 coupled to the first internal water line 625 and configured to stop or start a flow of cold water received from the cold water supply line 620. The portable hip-warn organic entity termination applicator unit 600 can include a second internal water line 632 coupled to the water shutoff valve 630. In some embodiments, the herbicide adjustment valve 634 is coupled to the second internal water line 632. The portable hip-warn organic entity termination applicator unit 600 can include a third internal water line 638 coupled to the herbicide adjustment valve 634 and to the organic herbicide reservoir 640.

The portable hip-warn organic entity termination applicator unit 600 can include a water bypass supply line 642 coupled to the herbicide adjustment valve 634 and configured to transmit bypass water to the heater core 644. The portable hip-warn organic entity termination applicator unit 600 can include a T fitting 648 coupled to the water bypass supply line 642. The portable hip-warn organic entity termination applicator unit 600 can include an herbicide mixture supply line 646 coupled to the T fitting 648 and configured to transmit the herbicide water liquid mixture. In some embodiments, the T fitting is coupled to the heater core 644, and the heater core 644 is configured to heat at least one of the bypass water or the herbicide water liquid mixture.

In some embodiments, the herbicide adjustment valve 634 includes manual adjustment means (e.g., knob 636) for adjusting the amount of water received from the cold water supply line 620 and traveling from the second internal water line 632 to the third internal water line 638 to be mixed with the organic herbicide held in the organic herbicide reservoir 640.

Figure 8:
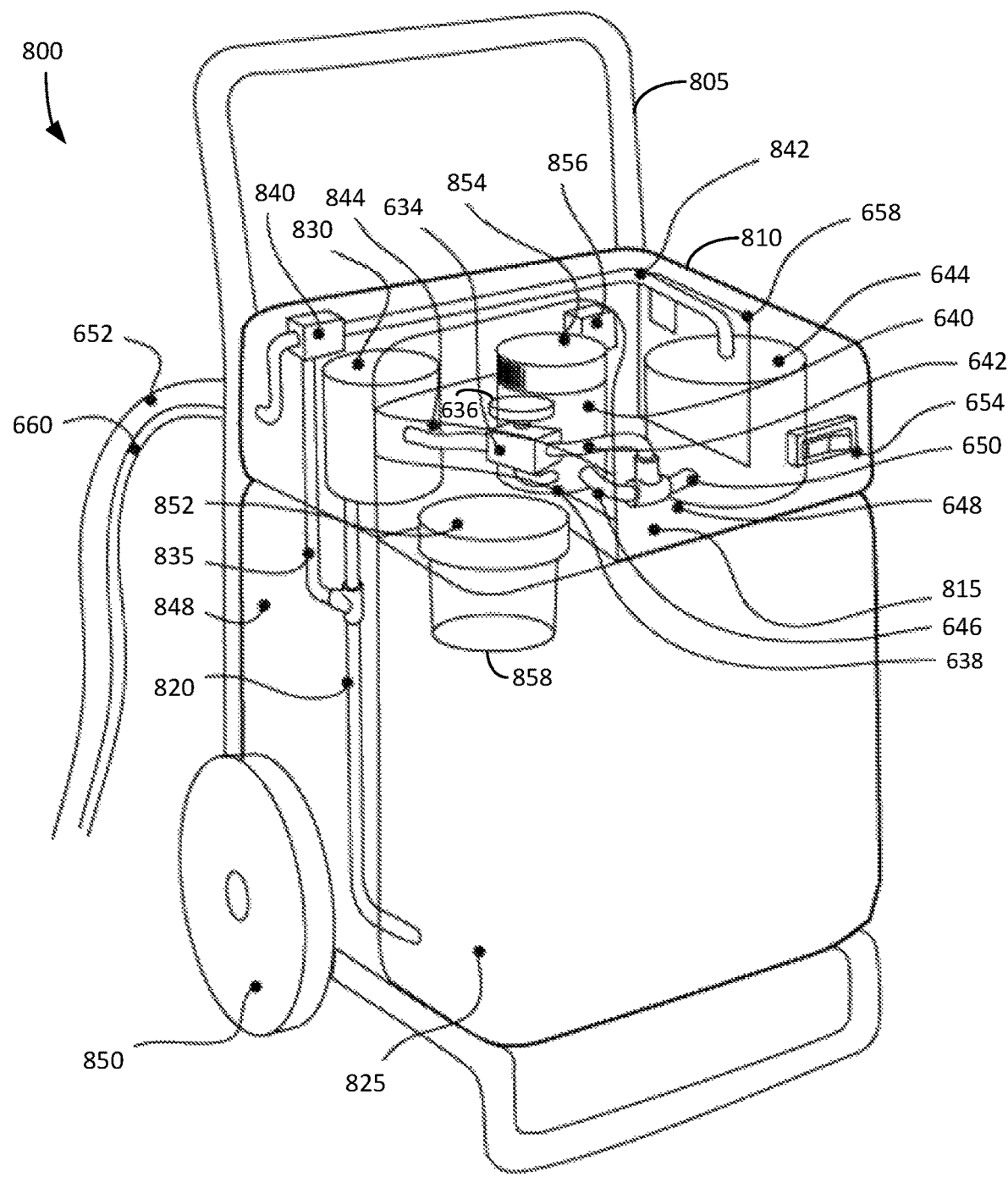
FIG. 8 illustrates an example portable battery-powered applicator unit, in accordance with various embodiments.

FIG. 8 illustrates an example portable battery-powered applicator unit 800, in accordance with various embodiments. The portable applicator unit 800 can include a handle bar 805 attached to an outer housing 810. The portable applicator unit 800 can include one or more wheels 850. In some embodiments, the portable applicator unit 800 is a two-wheeled portable cart. In some embodiments, the handle bar 805 is adjustable so that persons of any stature can comfortably pull or push the portable applicator unit 800 to the desired location. The outer housing 810 can include a pump and heater housing 815. The pump and heater housing 815 can include a removable cover on at least one side thereof to provide easy access to internal components of the portable applicator unit 800.

The portable applicator unit 800 can include a cold water supply line 820. The cold water supply line 820 can receive water from a water supply reservoir 825. The cold water supply line 820 can be, for example, a hose or a pipe. The cold water supply line 820 can be coupled to the water supply reservoir 825. The cold water supply line 820 can be coupled to a water pump 830 and to a pressure relief line 835. The pressure relief line 835 can be coupled to a pressure bypass valve 840. The pressure bypass valve 840 can open the relief line 835 back to the water supply reservoir 825 via the pressure relief line 835. For example, when the water pump 830 stops pushing liquid through the heater core 644, heated water left in the heated liquid supply line 652 might otherwise "dribble" out the end of the wand (e.g., 700 of FIG. 7). The pressure bypass valve 840 can close off the heated liquid supply line 652, and open the pressure relief line 835 back to the water supply reservoir 825 so that liquid doesn't continue out the end of the wand. Otherwise, the path through the relief line 835 can normally be kept closed.

The pressure bypass valve 840 can receive heated liquid from a heater core 644 via an exit line 842, which can be transmitted as a heated liquid supply to a wand (e.g., 700 of FIG. 7) via the heated liquid supply line 652. The water supply reservoir 825 can include a water supply access cap 852. The water supply access cap 852 can be coupled to a filter screen 858 for filtering water received through an opening associated with the access cap 852 and into the water supply reservoir 825.

The portable applicator unit 800 can include an organic herbicide reservoir 640. The organic herbicide reservoir 640 can be coupled to an herbicide adjustment valve 634 via an internal water line 638. The organic herbicide reservoir 640 can include a reservoir access cap 854. Herbicide can be refilled via the reservoir access cap 854. The heater core 644 can be coupled to the organic herbicide reservoir 640 via a water bypass supply line 642 and an herbicide mixture supply line 646.

The herbicide adjustment valve 634 can include a knob 636. The herbicide adjustment valve 634 can be coupled to the organic herbicide reservoir 640 via the internal water line 638. The knob 636 provides the user with the ability to adjust the amount of water traveling from a pressure supply line 844 to the internal water line 638 to be mixed with herbicide stored in the organic herbicide reservoir 640. It will be understood that instead of a knob, a lever, a slider, or other suitable adjusting means can be used. The herbicide adjustment valve 634 can adjust whether and how much water flows through the internal water line 638 for mixing with herbicide stored in the organic herbicide reservoir 640.

Water transmitted through the water bypass supply line 642 can be mixed with an herbicide and water mixture transmitted through the herbicide mixture supply line 646, and transmitted to the heater core 644 via the combined liquid line 650. In other words, the herbicide and water mixture stored in the organic herbicide reservoir 640 can be transmitted to the herbicide mixture supply line 646. The herbicide adjustment valve 634 can adjust whether and how much water flows through the water bypass supply line 642 for mixing with the herbicide and water mixture from the organic herbicide reservoir 640.

The organic herbicide reservoir 640 can be completely bypassed using the knob 636. For example, the knob 636 can cause the herbicide adjustment valve 634 to force all water coming from the pressure supply line 844 to the water bypass supply line 642. The water bypass supply line 642 can transmit the bypass water to the heater core 644. Alternatively, when the herbicide adjustment valve 634 is not configured to bypass the organic herbicide reservoir 640, the water and herbicide mixture can exit the organic herbicide reservoir 640 via the herbicide and water mixture supply line 646.

In some embodiments, some water can be transmitted via the water bypass supply line 642 while some water and herbicide mixture can be transmitted via the herbicide mixture supply line 646. In an alternative embodiment, water can be transmitted via the water bypass supply line 642 while no water and herbicide mixture is transmitted via the herbicide mixture supply line 646. In yet another alternative embodiment, no water is transmitted via the water bypass supply line 642 while the water and herbicide mixture can be transmitted via the herbicide mixture supply line 646.

The quantity of each amount of liquid being transmitted via the water bypass supply line 642 and the herbicide mixture supply line 646 can be controlled using the knob 636. Any water being transmitted via the water bypass supply line 642, and any water and herbicide mixture supply being transmitted via the line 646, can meet and travel through a T fitting 648, which can join the two streams of liquid into a single stream. The mixture of liquids can be in a pressurized state due to pressure from the water pump 830. The pressurized water liquid and/or water and herbicide liquid mixture can be transmitted through the combined liquid line 650 to the heater core 644, then to the exit line 842, and eventually to the heated liquid supply line 652, and then to the wand (e.g., 700 of FIG. 7). The heater core 644 can pre-heat the liquid.

The portable applicator unit 800 can include an electrical on/off switch 654 and a battery array 848. The electrical on/off switch 654 can cause electrical current to flow from the battery array 848 to the various components within the portable applicator unit 800 that need power to operate, such as the heater core 644, the water pump 830, an electronics control module 658, the herbicide adjustment valve 634, and/or a wand control and power supply line 660. It will be understood that for the sake of simplicity in illustration, the various internal electrical wires and connections are not shown. The electronics control module 658 can control a heat level of the heater core 644, a pump duty cycle of the water pump 830, and other functions of the wand, such as flash heating, as described above. The heated liquid supply line 652 and the wand control and power supply line 660 can be coupled to a hand-held wand 700, as described above with reference to FIG. 7. The portable applicator unit 800 can include a recharge port 856. The recharge port 856 can include a plug socket for receiving a standard Type A through Type O electrical plug for charging from mains.

Reference is now made to FIGS. 7 and 8. In some embodiments, a portable battery-powered organic entity termination applicator unit 800 includes an outer housing 810. The portable battery-powered organic entity termination applicator unit 800 can include a handle bar 805 coupled to the outer housing 810. The portable battery-powered organic entity termination applicator unit 800 can include one or more wheels 850 coupled to the outer housing 810 and configured to provide mobility for the portable battery-powered organic entity termination applicator unit 800.

The portable battery-powered organic entity termination applicator unit 800 can include a water supply reservoir 825 configured to hold water. The portable battery-powered organic entity termination applicator unit 800 can include a cold water supply line 820 coupled to the water supply reservoir 825. The portable battery-powered organic entity termination applicator unit 800 can include an organic herbicide reservoir 640 configured to hold organic herbicide. The portable battery-powered organic entity termination applicator unit 800 can include an herbicide adjustment valve 634 configured to adjust an amount of water received from the cold water supply line 820 to be mixed with the organic herbicide held in the organic herbicide reservoir 640 to produce an herbicide water liquid mixture.

The portable battery-powered organic entity termination applicator unit 800 can include a heater core 644 configured to pre-heat the herbicide water liquid mixture. The portable battery-powered organic entity termination applicator unit 800 can include a flexible insulated heated liquid supply line 652 coupled to the heater core 644 and configured to receive the pre-heated herbicide water liquid mixture. The portable battery-powered organic entity termination applicator unit 800 can include a rigid hand-holdable wand 700 coupled to a terminal end of the flexible insulated heated liquid supply line 652. In some embodiments, the rigid hand-holdable wand 700 includes a hollow interior configured to transmit the pre-heated herbicide water liquid mixture through the hollow interior, and eject the pre-heated herbicide water liquid mixture out of a terminal end of the rigid hand-holdable wand 700.

The portable battery-powered organic entity termination applicator unit 800 can include a wand flash heater 705 configured to flash-heat the pre-heated herbicide water liquid mixture prior to being ejected out of the terminal end of the rigid hand-holdable wand 700. In some embodiments, the wand flash heater 705 includes a flash heater core body 720 and an internal heated channel coil 725 through which the pre-heated herbicide water liquid mixture travels. In some embodiments, the internal heated channel coil 725 is disposed in the flash heater core body 720. A spray orifice 735 can be disposed at a terminal end of the internal heated channel coil 725. In some embodiments, the spray orifice 735 is configured to eject the pre-heated and flash-heated herbicide water liquid mixture out of the rigid hand-holdable wand 700.

The portable battery-powered organic entity termination applicator unit 800 can include one or more batteries 848 disposed within the outer housing 810. The portable battery-powered organic entity termination applicator unit 800 can include an electronics control module 658 configured to receive power from the one or more batteries 848 and to control a heat level of the heater core 644. The portable battery-powered organic entity termination applicator unit 800 can include an on/off switch 654 configured to prevent or to cause electrical current to flow from the one or more batteries 848 to the electronics control module 658 and the heater core 644.

The portable battery-powered organic entity termination applicator unit 800 can include a water pump 830 coupled to the cold water supply line 820. The portable battery-powered organic entity termination applicator unit 800 can include a pressure relief line 835 coupled to the water pump 830. The portable battery-powered organic entity termination applicator unit 800 can include a pressure bypass valve 840 coupled to the pressure relief line 835. In some embodiments, the pressure bypass valve 840 is configured to open the pressure relief line 835 back to the water supply reservoir 825 when the water pump 830 stops pushing liquid through the heater core 644, thereby preventing dribble of liquid out of a terminal end of the rigid hand-holdable wand 700.

The portable battery-powered organic entity termination applicator unit 800 can include a pressure supply line 844 coupled to the water pump 830 and to the herbicide adjustment valve 634. The portable battery-powered organic entity termination applicator unit 800 can include an internal water line 638 coupled to the herbicide adjustment valve 634 and to the organic herbicide reservoir 640. The portable battery-powered organic entity termination applicator unit 800 can include a water bypass supply line 642 coupled to the herbicide adjustment valve 634 and configured to transmit bypass water to the heater core 644. The portable battery-powered organic entity termination applicator unit 800 can include a T fitting 648 coupled to the water bypass supply line 642. The portable battery-powered organic entity termination applicator unit 800 can include an herbicide mixture supply line 646 coupled to the T fitting 648 and configured to transmit the herbicide water liquid mixture. In some embodiments, the T fitting 648 is coupled to the heater core 644, and the heater core 644 is configured to heat at least one of the bypass water or the herbicide water liquid mixture.

In some embodiments, the herbicide adjustment valve 634 includes manual adjustment means (e.g., knob 636) for adjusting the amount of water received from the cold water supply line 820 and traveling from the pressure supply line 844 to the internal water line 638 to be mixed with the organic herbicide held in the organic herbicide reservoir 640.

Figure 9:
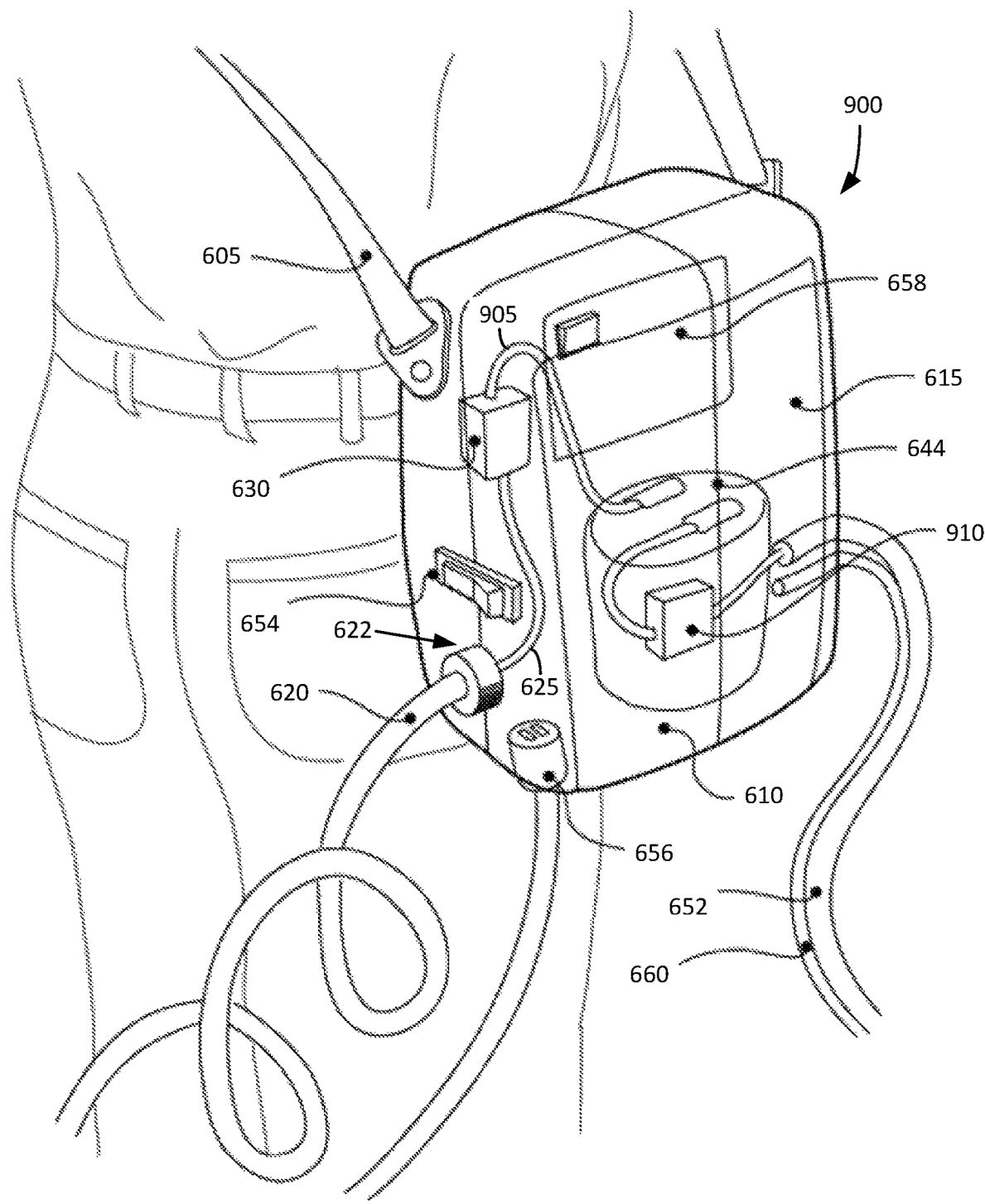
FIG. 9 illustrates an example herbicideless hip-worn applicator, in accordance with various embodiments.

FIG. 9 illustrates an example herbicideless hip-worn applicator unit 900, in accordance with various embodiments. The herbicideless hip-worn applicator unit 900 can include a shoulder strap 605 attached to an outer housing 610. The shoulder strap 605 can be adjustable so that persons of any stature can comfortably wear and carry the herbicideless hip-worn applicator unit 900 near their hip. The outer housing 610 can include a removable cover 615 on at least one side thereof to provide easy access to internal components of the herbicideless hip-worn applicator unit 900.

The herbicideless hip-worn applicator unit 900 can include or otherwise receive a cold water supply line 620. The cold water supply line 620 can be, for example, a hose. The cold water supply line 620 can be attached to the outer housing 610. The cold water supply line 620 can be coupled to a first internal water line 625, which can be coupled to a water shutoff valve 630. The water shut off valve 630 can be controlled by the user. In other words, the user can control whether water is flowing through the herbicideless hip-worn applicator unit 900 by either turning on or off the water shut off valve 630.

The herbicideless hip-worn applicator unit 900 can include the heater core 644. The water shut off valve 630 can be coupled to a second internal water line 905, which itself is coupled to the heater core 644. The heater core 644 can pre-heat the liquid. The heater core 644 can be coupled to a heated liquid supply line 652. A pressure heated water blow off valve and drain 910 can be disposed between the heater core 644 and the heated liquid supply line 652. The pressure heated water blow off valve and drain 910 can relieve excessive liquid pressure build up in the heated liquid supply line 652. For example, when the water shutoff valve 630 is switched from an on to an off position, the valve and drain 910 can prevent excess liquid from flowing into the heated liquid supply line 652 and out the end of the wand (e.g., 700 of FIG. 7).

The herbicideless hip-worn applicator unit 900 can include an electrical on/off switch 654 and a power supply line 656. The electrical on/off switch 654 can cause electrical current to flow from the power supply line 656 to the various components within the herbicideless hip-worn applicator unit 900 that need power to operate, such as the heater core 644, an electronics control module 658, and/or the wand control and power supply line 660. It will be understood that for the sake of simplicity in illustration, all of the various internal electrical wires and connections are not shown. The electronics control module 658 can control a heat level of the heater core 644 and other functions of a wand, such as flash heating, as described above with reference to FIG. 7. The heated liquid supply line 652 and the wand control and power supply line 660 can be coupled to a hand-held wand, as described above.

Reference is now made to FIGS. 7 and 9. In some embodiments, a portable hip-worn herbicideless organic entity termination applicator unit 900 includes an outer housing 610 including a removable cover 615. The portable hip-worn herbicideless organic entity termination applicator unit 900 can include an adjustable shoulder strap 605 coupled to the outer housing 610 and configured to hold the outer housing 610 at about a hip-level of a user. The portable hip-worn herbicideless organic entity termination applicator unit 900 can include a water inlet 622 configured to receive a cold water supply line 620. The portable hip-worn herbicideless organic entity termination applicator unit 900 can include a heater core 644 configured to pre-heat water received from the cold water supply line 620. The portable hip-worn herbicideless organic entity termination applicator unit 900 can include a flexible insulated heated liquid supply line 652 coupled to the heater core 644 and configured to receive the pre-heated water. The portable hip-worn herbicideless organic entity termination applicator unit 900 can include a rigid hand-holdable wand 700 coupled to a terminal end of the flexible insulated heated liquid supply line 652. In some embodiments, the rigid hand-holdable wand 700 includes a hollow interior configured to transmit the pre-heated water through the hollow interior, and eject the pre-heated water out of a terminal end of the rigid hand-holdable wand 700.

The portable hip-warn herbicideless organic entity termination applicator unit 900 can include a wand flash heater 705 configured to flash-heat the pre-heated herbicide water liquid mixture prior to being ejected out of the terminal end of the rigid hand-holdable wand 700. In some embodiments, the wand flash heater 705 includes a flash heater core body 720 and an internal heated channel coil 725 through which the pre-heated herbicide water liquid mixture travels. In some embodiments, the internal heated channel coil 725 is disposed in the flash heater core body 720. A spray orifice 735 can be disposed at a terminal end of the internal heated channel coil 725. In some embodiments, the spray orifice 735 is configured to eject the pre-heated and flash-heated herbicide water liquid mixture out of the rigid hand-holdable wand 700.

The portable hip-warn herbicideless organic entity termination applicator unit 900 can include a power supply line 656 coupled to the outer housing 610. The portable hip-warn herbicideless organic entity termination applicator unit 900 can include an electronics control module 658 configured to receive power from the power supply line 656 and to control a heat level of the heater core 644. The portable hip-warn herbicideless organic entity termination applicator unit 900 can include an on/off switch 654 configured to prevent or to cause electrical current to flow from the power supply line 656 to the electronics control module 658 and the heater core 644.

The portable hip-warn herbicideless organic entity termination applicator unit 900 can include a first internal water line 625 coupled to the cold water supply line 620. The portable hip-warn herbicideless organic entity termination applicator unit 900 can include a water shutoff valve 630 coupled to the first internal water line 625 and configured to stop or start a flow of cold water received from the cold water supply line 620. The portable hip-warn herbicideless organic entity termination applicator unit 900 can include a second internal water line 905 coupled to the water shutoff valve 630.

The portable hip-warn herbicideless organic entity termination applicator unit 900 can include a pressure heated water blow off valve and drain 910 coupled to the heater core 644 and to the flexible insulated heated liquid supply line 652, and configured to relieve excessive liquid pressure build up in the heated liquid supply line 652.

Figure 10:
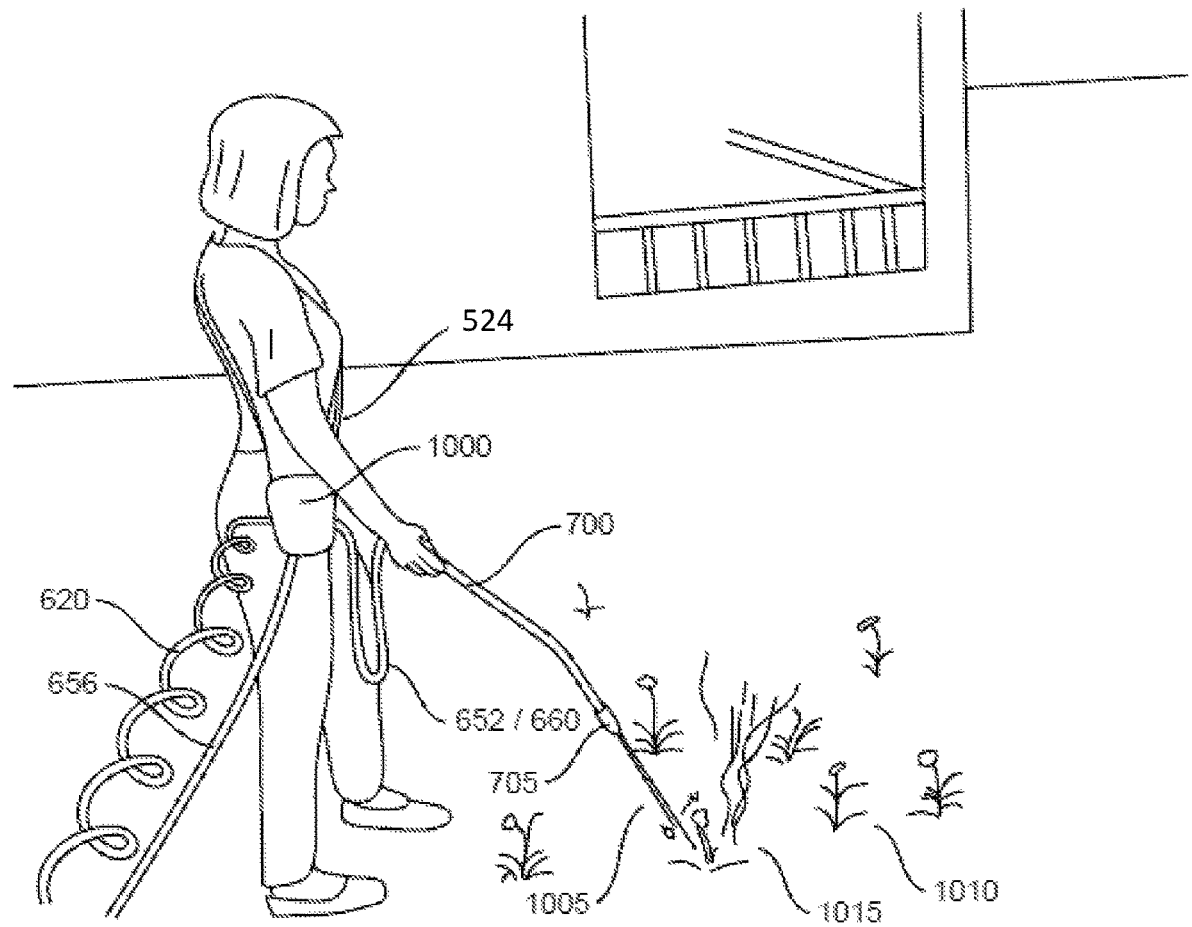
FIG. 10 depicts another example of a user using an applicator, in accordance with various embodiments.

FIG. 10 depicts another example of a user using an applicator 1000, in accordance with various embodiments. The applicator 1000 can include any of the hip-worn applicators described herein. The applicator 1000 can include an insulated hand-held wand 700. The applicator 1000 can include the heated liquid supply line 652 and/or the wand control and power supply line 660. The applicator 1000 can include the cold water supply line 620 and/or the power supply line 656. The applicator 1000 can include the wand flash heater 705. The applicator 1000 can expel a heated jet of liquid 1005. The heated jet of liquid 1005 can have a water toothpick-like intensity to burst and damage cells within unwanted plants. For example, the heated jet 1005 of liquid can quickly and easily turn live weeds 1010 into dead weeds 1015 with high precision, without damaging good and desirable plants located nearby.

Figure 11:
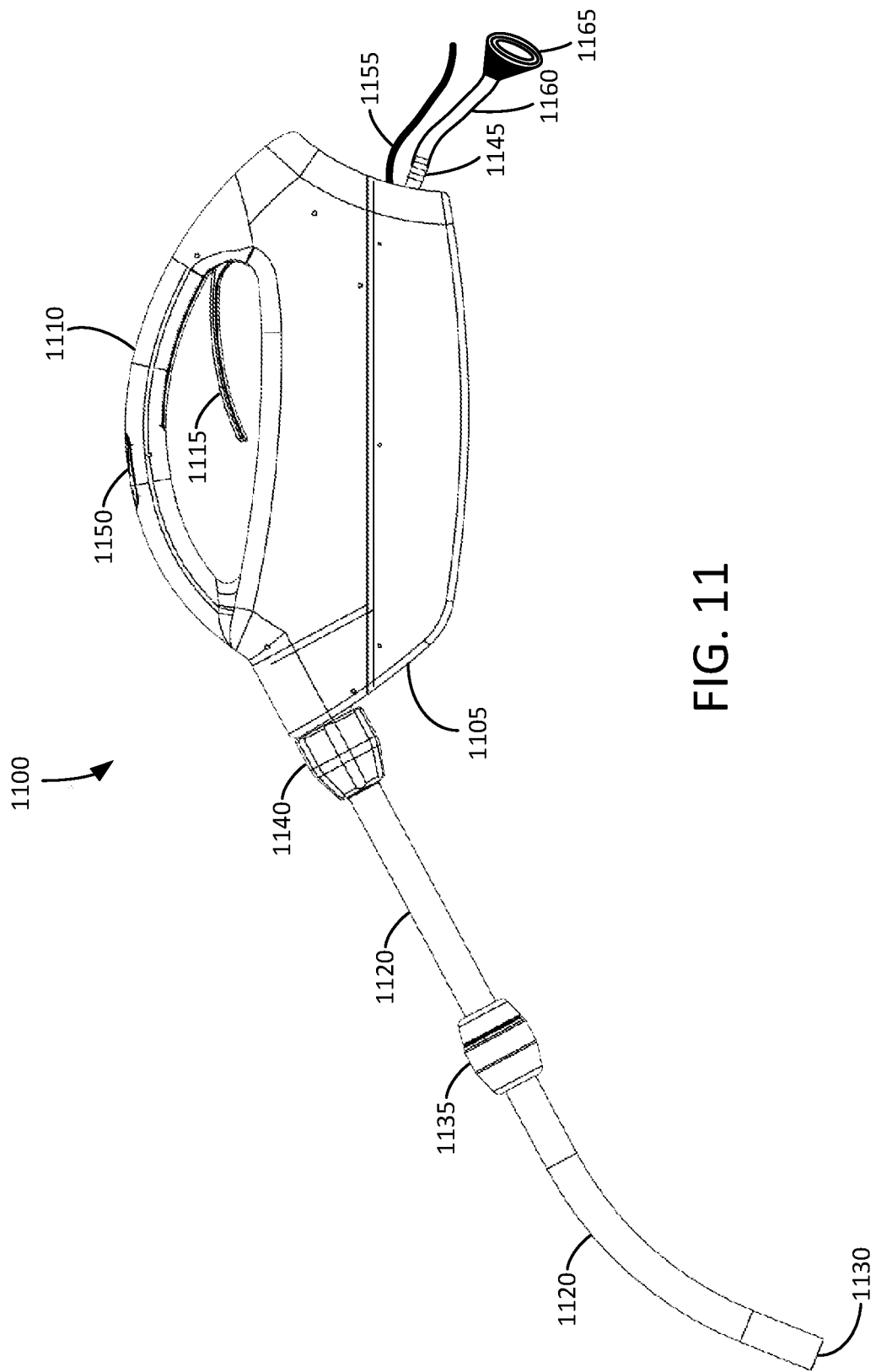
FIG. 11 illustrates a side view of an example all-in-one hand-held applicator, in accordance with various embodiments.
Figure 12:
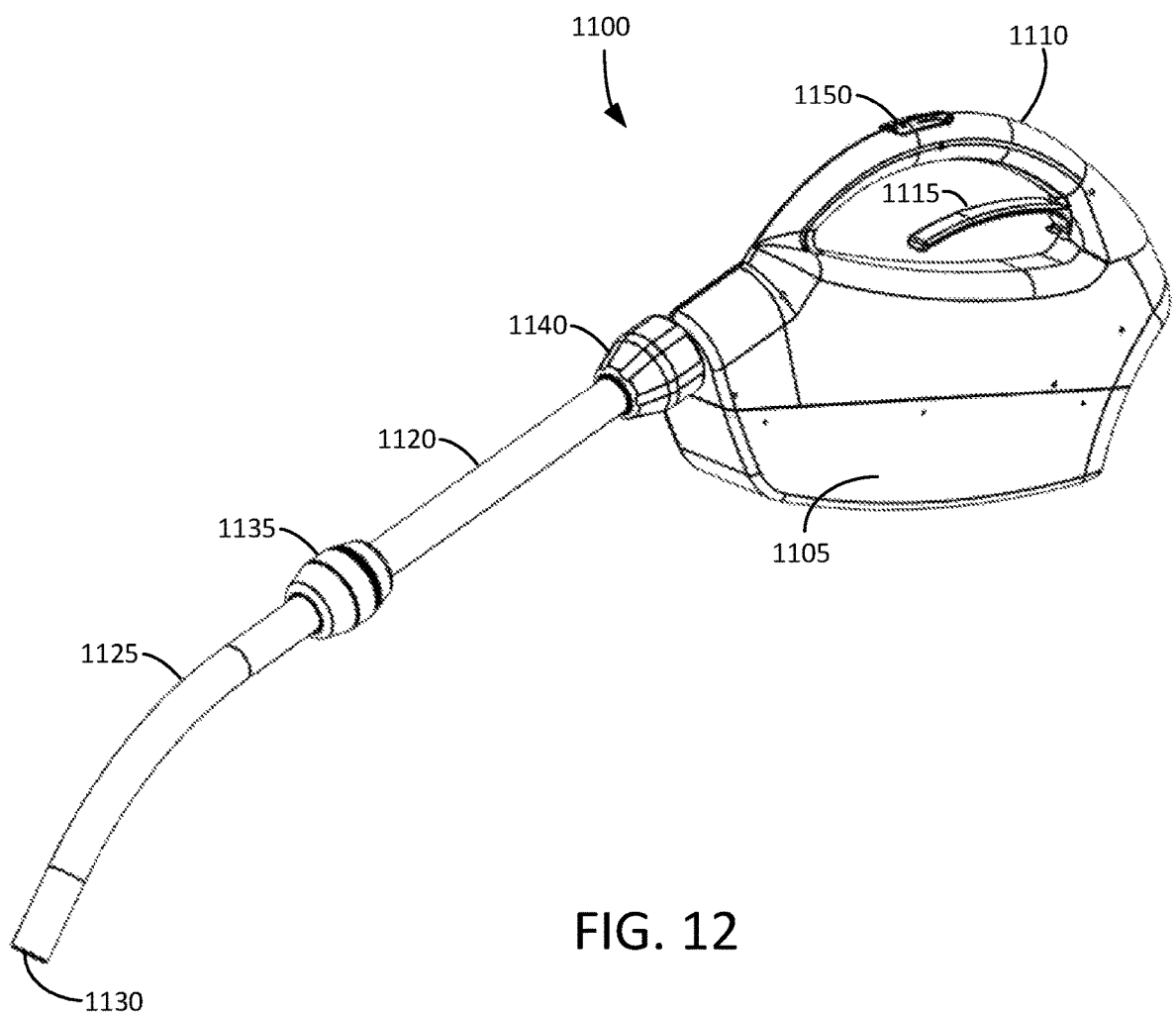
FIG. 12 illustrates a perspective view of the example all-in-one hand-held applicator, in accordance with various embodiments.

FIG. 11 illustrates a side view of an example all-in-one hand-held applicator unit 1100, in accordance with various embodiments. FIG. 12 illustrates a perspective view of the example all-in-one hand-held applicator unit 1100, in accordance with various embodiments. Reference is now made to FIGS. 11 and 12.

The all-in-one hand-held applicator unit 1100 may include an outer housing 1105, a hand grip 1110, a safety lever 1115, a delivery pipe 1120, and a spray tip 1130. The hand-held applicator unit 1100 may include an electrical line 1155 to provide power to the hand-held applicator unit 1100. The hand-held applicator unit 1100 may include a flexible water hose 1160 coupled to the outer housing 1105. The flexible water hose 1160 may be coupled to the outer housing 1105 using a barb 1145, which can be, for example, a nylon barb. The flexible water hose 1160 can include a threaded attachment part 1165 for connection to a longer hose, which can be connected to a water source. The flexible water hose 1160 can provide water to the hand-held applicator unit 1100.

The hand-held applicator unit 1100 can include a switch or button 1150 atop the hand grip 1110. The switch or button 1150 can turn the applicator unit 1100 on or off. The delivery pipe 1120 can be coupled to the outer housing 1105 using a nose pipe nut 1140. In some embodiments, the delivery pipe 1120 is rigid. In some embodiments, the delivery pipe 1120 is made of polyethylene. In some embodiments, the delivery pipe 1120 is made of metal, plastic, or another suitable rigid material or amalgam thereof. In some embodiments, the delivery pipe 1120 is flexible or jointed. In some embodiments, the delivery pipe 1120 has two sections coupled together using a split pipe fitting 1135. The spray tip 1130 can be coupled to a first terminal end of the delivery pipe 1120. The delivery pipe 1120 can include a downward bend to direct the jet of liquid toward one or more leaves, stems, branches, or a trunk of a plant.

Figure 13:
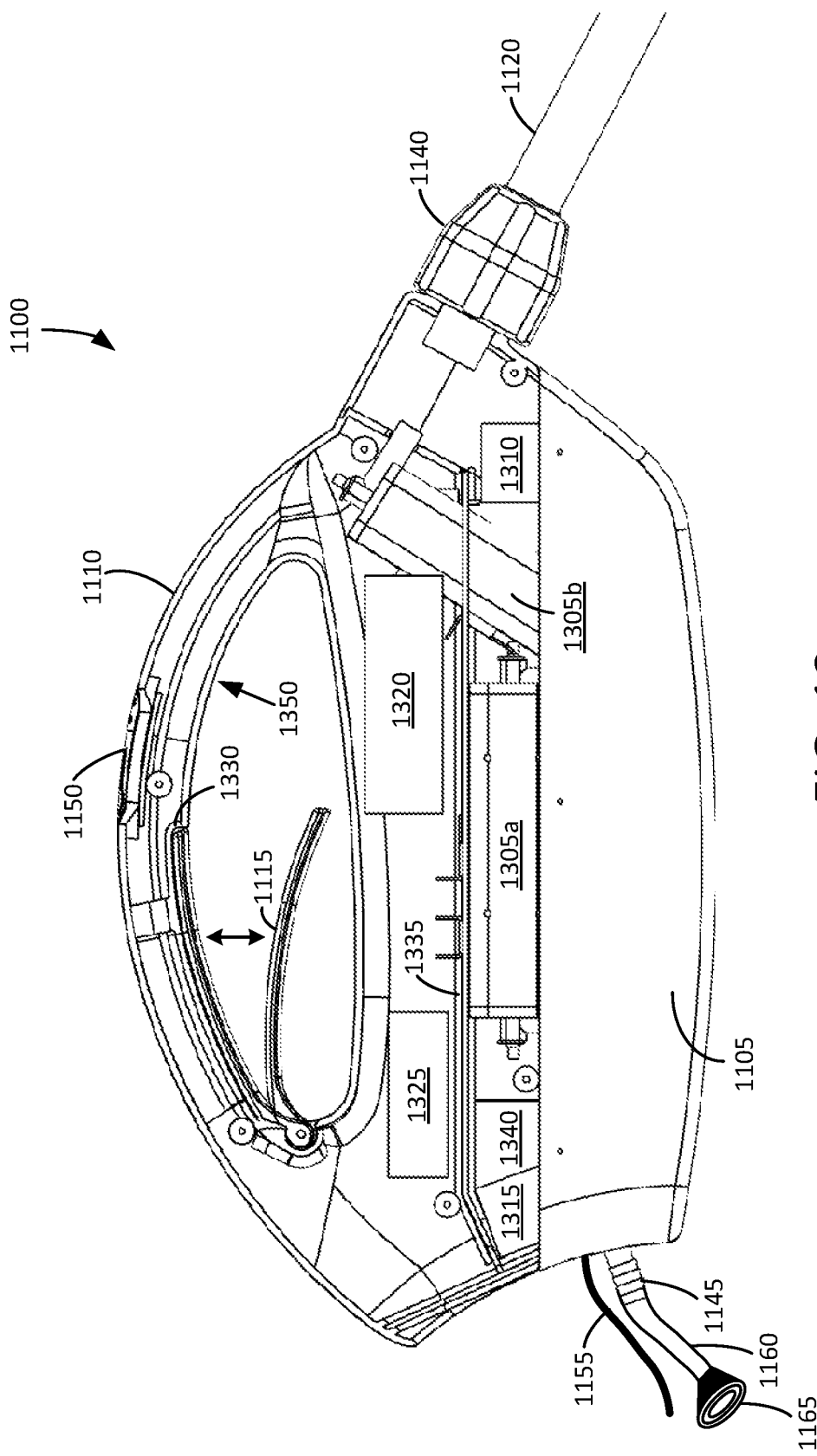
FIG. 13 illustrates a side view of the example all-in-one hand-held applicator with some of the internal components being visible, in accordance with various embodiments.

FIG. 13 illustrates a side view of the example all-in-one hand-held applicator unit 1100 with some of the internal components being visible, in accordance with various embodiments. The all-in-one hand-held applicator unit 1100 can include a solenoid valve 1315, a solid state relay 1325, a fire-proof wall 1335, a power supply 1320, a pump 1310, and one or more heating units (e.g., 1305a and 1305b). The one or more heating units can heat the liquid using electrical heaters. In some embodiments, the valve 1315 is not included. In some embodiments, the pump 1310 is not included.

The portable all-in-one hand-held organic entity termination applicator unit 1100 can include a reservoir chamber 1340 coupled with a water line (e.g., 408 of FIG. 4) and can store an organic herbicide in the herbicide reservoir chamber 1340. The chamber 1340 can introduce the organic herbicide from the chamber 1340 to a liquid in the water line, such as water. In an alternate embodiment, the chamber 1340 is not included, and therefore the applicator unit 1100 can be an herbicideless applicator unit. In some embodiments, the chamber 1340 may be bypassed as described above. The pump 1310 can be coupled with the water line and pressurize the liquid in the water line. In an alternate embodiment, no pump 1310 is required, and the water line can be pressurized by the water source through the water hose 1160. In some embodiments, the water line is pressurized by a pump that is external to the applicator unit 1100. The liquid can include the organic herbicide. The one or more heating units (e.g., 1305a and 1305b) can be coupled with the water line. The one or more heating units (e.g., 1305a and 1305b) can heat the liquid to create a heated liquid.

The spray tip (e.g., 1130 of FIG. 11) can be coupled with the one or more heating units (e.g., 1305a and 1305b) and can expel the heated liquid in a jet of liquid from the applicator unit 1100. The applicator unit 1100 can include an applicator body or housing 1105, which can include the hand grip 1110. The chamber 1340 and the pump 1310 can be housed within an interior of the applicator body 1105. The one or more heating units (e.g., 1305a and 1305b) can be disposed within the applicator body 1105 and/or toward an end of the delivery pipe 1120.

The portable all-in-one hand-held organic entity termination applicator unit 1100 can include the delivery pipe 1120, which can include a first terminal end (e.g., at 1130) and an opposed second end (e.g., at 1140). The delivery pipe 1120 can be coupled to the one or more heating units (e.g., 1305a and 1305b). The delivery pipe 1120 can include a single hollow housing. The first terminal end (e.g., at 1130) of the delivery pipe 1120 is a terminal end of the single hollow housing. The spray tip 1130 can be coupled to the first terminal end of the delivery pipe 1120. The water line can extend through the single hollow housing of the delivery pipe 1120 from the second end (e.g., at 1140) of the delivery pipe 1120 to the spray tip 1130 at the first terminal end of the delivery pipe 1120. The spray tip 1130 can be directly coupled to the terminal end of the single hollow housing.

The pump 1310 and the one or more heating units (e.g., 1305a and 1305b) can expel the heated liquid through the hollow housing of the delivery pipe 1120 and through the spray tip 1130 at the terminal end of the single hollow housing. The pump 1310 can pressurize the liquid in the water line to a pressure of between 30 and 500 pounds per square inch. The one or more heating units (e.g., 1305a and 1305b) can expel the heated liquid through the delivery pipe 1120. The delivery pipe 1120 can expel the heated liquid through the spray tip 1130 in the form of a single jet of liquid.

In some embodiments, the pump 1310 can pressurize the liquid in the water line to a pressure of at least 30 pounds per square inch. In some embodiments, the pump 1310 can pressurize the liquid in the water line to a pressure of at least 250 pounds per square inch. The delivery pipe 1120 is directable by movement of the hand grip 1110 such that the spray tip 1130 and the single jet of liquid are directable. The one or more heating units (e.g., 1305a and 1305b) can heat the liquid to a temperature of at least 165 degrees Fahrenheit. The spray tip 1130 can expel the heated liquid as a stream of liquid rather than steam to burst cells on a surface of a plant, and to penetrate, by the heated liquid, deeper into layers of the plant. The one or more heating units (e.g., 1305a and 1305b) can be positioned between the chamber 1340 and the spray tip 1130. In some embodiments, the spray tip 1130 can spray the heated liquid in a conically shaped spray.

The portable all-in-one hand-held organic entity termination applicator unit 1100 can include a water supply line (e.g., 405 of FIG. 4) directly connected to the pump 1310. The chamber 1340 can be coupled to the pump 1310 via a first section of the water line and via an optional valve (e.g., 403 of FIG. 4 or 1315 of FIG. 13), and the valve is configured to have an open position and a closed position. The valve can be disposed in the first section of the water line between the chamber 1340 and the pump. The one or more heating units (e.g., 1305a and 1305b) can be coupled to the chamber 1340 via a second section of the water line. The chamber 1340 can receive the pressurized liquid when the valve has the open position. The pump 1310 can pressurize the liquid in the water line to a pressure of between 30 and 500 pounds per square inch. The chamber 1340 can introduce the organic herbicide into the liquid in the water line such that the liquid includes water and the organic herbicide when the valve is in the open position. The valve can have a partially open position.

The one or more heating units (e.g., 1305a and 1305b) can expel the heated liquid through the delivery pipe 1120. The delivery pipe 1120 can expel the heated liquid through the spray tip 1130 in the form of a single jet of liquid. The applicator unit 1100 can include an electrical line coupled to a safety lever 1115. The safety lever 1115 can be disposed beneath the hand grip 1110. The safety lever can activate and deactivate the one or more heating units (e.g., 1305a and 1305b).

The portable all-in-one hand-held organic entity termination applicator unit 1100 can include a connector to connect the electric power line 1155 to the applicator body 1105. The solid state relay 1325 can tolerate, for example, a 25 Amp input from 4 to 32 VDC, and an output load of from 24 to 380 VAC. The hand grip 1110 can include a button or a switch 1150 disposed atop thereof. The button or the switch 1150 can power on or power off the applicator unit 1100.

The fire-proof wall 1335 can be disposed between the one or more heating units (e.g., 1305a and 1305b) and the hand grip 1110, thereby protecting the user of the applicator unit 1100 from being burned. The safety lever 1115 can activate the one or more heating units (e.g., 1305a and 1305b) when squeezed to the hand grip 1110. The safety lever 1115 can deactivate the one or more heating units (e.g., 1305a and 1305b) when not squeezed to the hand grip 1110. The default or at-rest position of the safety lever 1115 can be the not-squeezed position. The hand grip 1110 can include a safety lever notch 1330 within a lower region of the hand grip 1110. The safety lever 1115 can fit within the safety lever notch 1330 and be flush with a lower surface 1350 of the hand grip 1110 when squeezed to the hand grip 1110.

Figure 14:
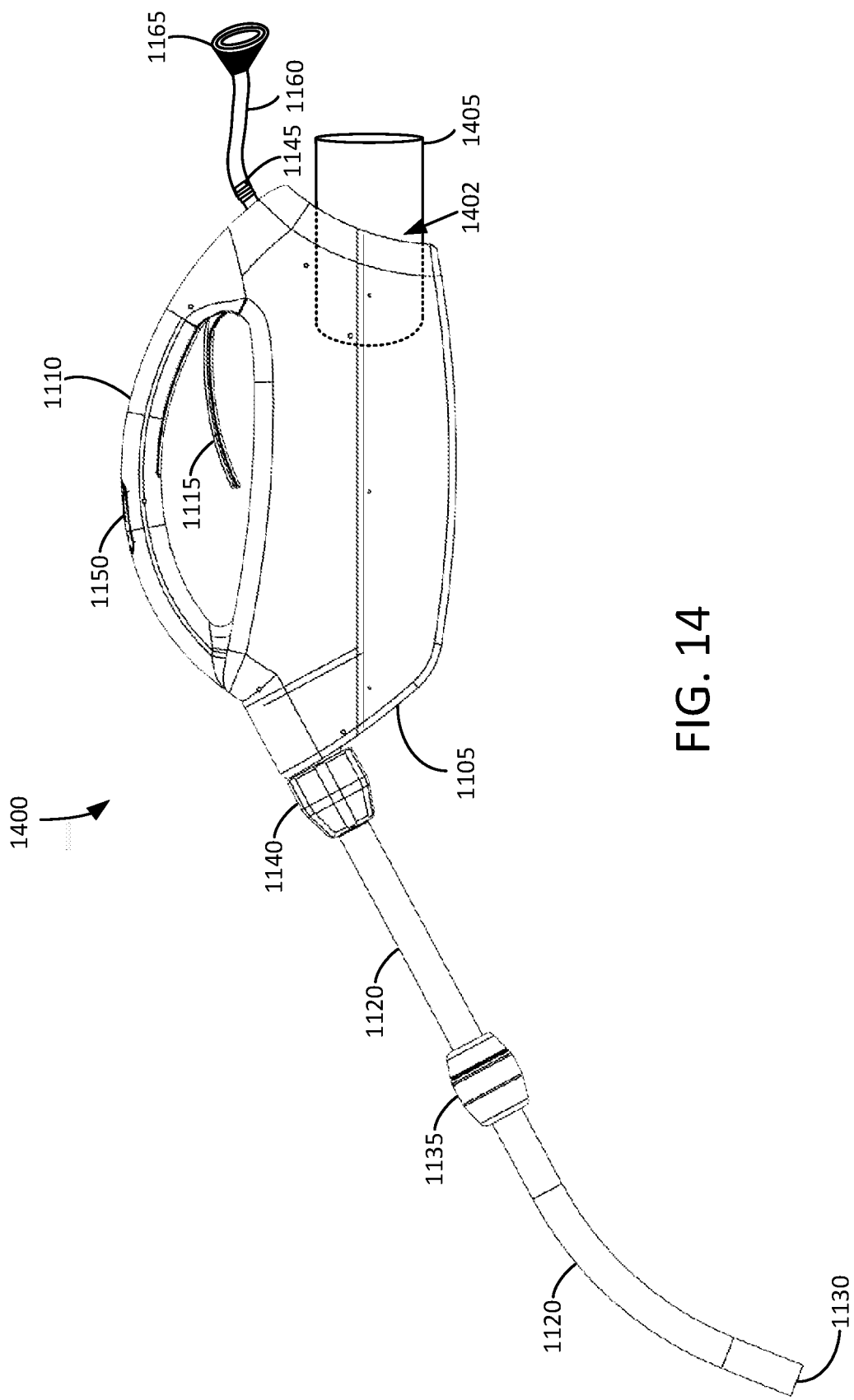
FIG. 14 illustrates a side view of an example all-in-one hand-held applicator having a fuel canister, in accordance with various embodiments.

FIG. 14 illustrates a side view of an example all-in-one hand-held fuel-based applicator unit 1400 having a fuel canister 1405, in accordance with various embodiments. The all-in-one fuel-based hand-held applicator unit 1400 may include an outer housing 1105, a hand grip 1110, a safety lever 1115, a delivery pipe 1120, and a spray tip 1130. The all-in-one hand-held fuel-based applicator unit 1400 may further include a fuel canister receptacle 1402. The fuel canister receptacle 1402 may receive a fuel canister 1405, which may be seated at least partially within the fuel canister receptacle 1402.

The hand-held fuel-based applicator unit 1400 need not include an electrical line to provide power to the hand-held fuel-based applicator unit 1400, because the primary function of heating the liquid is performed by the fuel canister and heater unit. Rather, the applicator unit 1400 can include a battery (described below) to provide all electrical needs of the applicator unit 1400. The hand-held fuel-based applicator unit 1400 may include a flexible water hose 1160 coupled to the outer housing 1105. The flexible water hose 1160 may be coupled to the outer housing 1105 using a barb 1145, which can be, for example, a nylon barb. The flexible water hose 1160 can include a threaded attachment part 1165 for connection to a longer hose, which can be connected to a water source. The flexible water hose 1160 can provide water to the hand-held fuel-based applicator unit 1400.

The hand-held fuel-based applicator unit 1400 can include a switch or button 1150 atop the hand grip 1110. The switch or button 1150 can turn the applicator unit 1400 on or off.

The delivery pipe 1120 can be coupled to the outer housing 1105 using a nose pipe nut 1140. In some embodiments, the delivery pipe 1120 is made of polyethylene. In some embodiments, the delivery pipe 1120 is made of metal, plastic, or another suitable rigid material or amalgam thereof. In some embodiments, the delivery pipe 1120 has two sections coupled together using a split pipe fitting 1135. The spray tip 1130 can be coupled to a first terminal end of the delivery pipe 1120. The delivery pipe 1120 can include a downward bend to direct the jet of liquid toward one or more leaves, stems, branches, or a trunk of a plant.

Figure 15:
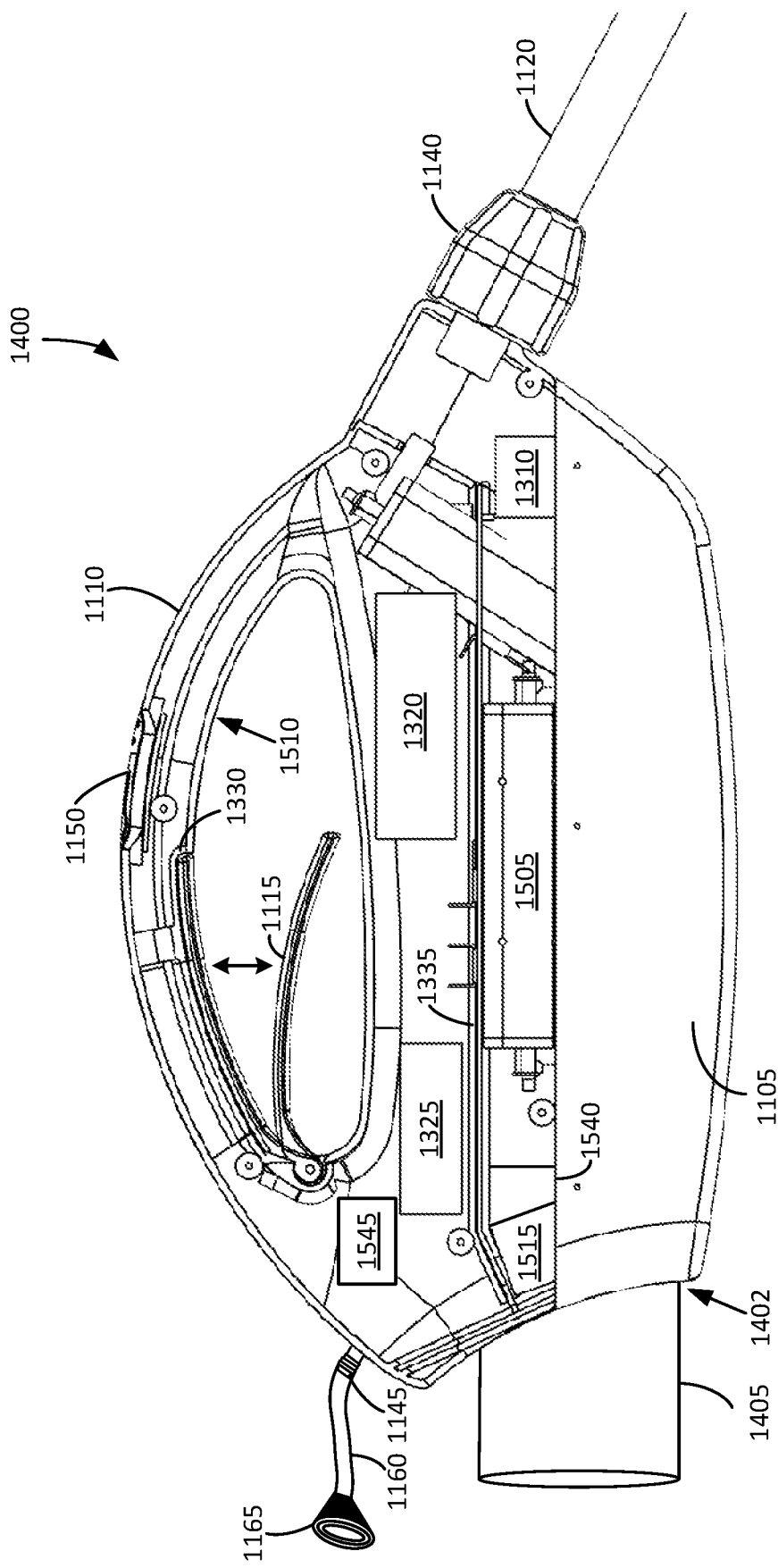
FIG. 15 illustrates a side view of the example all-in-one hand-held applicator having the fuel canister, and with some of the internal components being visible, in accordance with various embodiments.

FIG. 15 illustrates a side view of the example all-in-one hand-held fuel-based applicator unit 1400 having the fuel canister 1405, and with some of the internal components being visible, in accordance with various embodiments. The all-in-one hand-held fuel-based applicator unit 1400 can include a solenoid valve 1515, a solid state relay 1325, a fire-proof wall 1335, a power supply 1320, a pump 1310, and a fuel combustion heating unit 1505. The fuel combustion heating unit 1505 can heat the liquid using fuel stored in the fuel canister 1405. The fuel canister 1405 can be removed when empty and replaced with a canister having fuel. In some embodiments, the valve 1515 is not included. In some embodiments, the pump 1310 is not included.

The portable all-in-one hand-held organic entity termination applicator unit 1400 can include a reservoir chamber 1540 coupled with a water line (e.g., 408 of FIG. 4) and can store an organic herbicide in the herbicide reservoir chamber 1540. The chamber 1540 can introduce the organic herbicide from the chamber 1540 to a liquid in the water line, such as water. In an alternate embodiment, the chamber 1540 is not included, and therefore the applicator unit 1400 can be an herbicideless applicator unit. In some embodiments, the chamber 1540 may be bypassed as described above. The pump 1310 can be coupled with the water line and pressurize the liquid in the water line. In an alternate embodiment, no pump 1310 is required, and the water line can be pressurized by the water source through the water hose 1160. In some embodiments, the water line is pressurized by a pump that is external to the applicator unit 1400. The liquid can include the organic herbicide. The fuel combustion heating unit 1505 can be coupled with the water line. The fuel combustion heating unit 1505 can heat the liquid to create a heated liquid. The fuel canister receptacle 1402 can have the fuel canister 1405 seated therein. The fuel canister 1405 can be at least partially inserted into the fuel canister receptacle 1402 and removed therefrom. The fuel canister 1405 can be a propane tank. The fuel canister receptacle 1402 can receive the propane tank 1405. The fuel combustion heating unit 1505 can heat the liquid using propane stored in the propane tank 1405 seated within the receptacle 1402.

The spray tip (e.g., 1130 of FIG. 14) can be coupled with the fuel combustion heating unit 1505 and can expel the heated liquid in a jet of liquid from the applicator unit 1400. The applicator unit 1400 can include an applicator body or housing 1105, which can include the hand grip 1110. The chamber 1540 and the pump 1310 can be housed within an interior of the applicator body 1105. The fuel combustion heating unit 1505 can be disposed within the applicator body 1105 and/or toward an end of the delivery pipe 1120.

The portable all-in-one hand-held organic entity termination applicator unit 1400 can include the delivery pipe 1120, which can include a first terminal end (e.g., at 1130) and an opposed second end (e.g., at 1140). The delivery pipe 1120 can be coupled to the fuel combustion heating unit 1505. The delivery pipe 1120 can include a single hollow housing. The first terminal end (e.g., at 1130) of the delivery pipe 1120 is a terminal end of the single hollow housing. In some embodiments, the delivery pipe 1120 is rigid. In some embodiments, the delivery pipe 1120 is made of polyethylene. In some embodiments, the delivery pipe 1120 is made of metal, plastic, or another suitable rigid material or amalgam thereof. In some embodiments, the delivery pipe 1120 is flexible or jointed.

The spray tip 1130 can be coupled to the first terminal end of the delivery pipe 1120. The water line can extend through the single hollow housing of the delivery pipe 1120 from the second end (e.g., at 1140) of the delivery pipe 1120 to the spray tip 1130 at the first terminal end of the delivery pipe 1120. The spray tip 1130 can be directly coupled to the terminal end of the single hollow housing.

The pump 1310 and the fuel combustion heating unit 1505 can expel the heated liquid through the hollow housing of the delivery pipe 1120 and through the spray tip 1130 at the terminal end of the single hollow housing. The pump 1310 can pressurize the liquid in the water line to a pressure of between 30 and 500 pounds per square inch. The fuel combustion heating unit 1505 can expel the heated liquid through the delivery pipe 1120. The delivery pipe 1120 can expel the heated liquid through the spray tip 1130 in the form of a single jet of liquid.

In some embodiments, the pump 1310 can pressurize the liquid in the water line to a pressure of at least 30 pounds per square inch. In some embodiments, the pump 1310 can pressurize the liquid in the water line to a pressure of at least 250 pounds per square inch. The delivery pipe 1120 is directable by movement of the hand grip 1110 such that the spray tip 1130 and the single jet of liquid are directable. The fuel combustion heating unit 1505 can heat the liquid to a temperature of at least 165 degrees Fahrenheit. The spray tip 1130 can expel the heated liquid as a stream of liquid rather than steam to burst cells on a surface of a plant, and to penetrate, by the heated liquid, deeper into layers of the plant. The fuel combustion heating unit 1505 can be positioned between the chamber 1540 and the spray tip 1130. In some embodiments, the spray tip 1130 can spray the heated liquid in a conically shaped spray.

The portable all-in-one hand-held organic entity termination applicator unit 1400 can include a water supply line (e.g., 405 of FIG. 4) directly connected to the pump 1310. The chamber 1540 can be coupled to the pump 1310 via a first section of the water line and via an optional valve (e.g., 403 of FIG. 4 or 1515 of FIG. 15), and the valve is configured to have an open position and a closed position. The valve can be disposed in the first section of the water line between the chamber 1540 and the pump 1310. The fuel combustion heating unit 1505 can be coupled to the chamber 1540 via a second section of the water line. The chamber 1540 can receive the pressurized liquid when the valve has the open position. The pump 1310 can pressurize the liquid in the water line to a pressure of between 30 and 500 pounds per square inch. The chamber 1540 can introduce the organic herbicide into the liquid in the water line such that the liquid includes water and the organic herbicide when the valve is in the open position. The valve can have a partially open position.

The fuel combustion heating unit 1505 can expel the heated liquid through the delivery pipe 1120. The delivery pipe 1120 can expel the heated liquid through the spray tip 1130 in the form of a single jet of liquid. The applicator unit 1400 can include an electrical line coupled to a safety lever 1115. The safety lever 1115 can be disposed beneath the hand grip 1110. The safety lever can activate and deactivate the fuel combustion heating unit 1505.

The portable all-in-one hand-held organic entity termination applicator unit 1400 need not include an electric power line to the applicator body 1105, because the primary function of heating the liquid is performed by the fuel canister and heater unit. Rather, the applicator unit 1400 can include a battery 1545 to provide all electrical needs of the applicator unit 1400. The solid state relay 1325 can tolerate, for example, a 25 Amp input from 4 to 32 VDC, and an output load of from 24 to 380 VAC. The hand grip 1110 can include a button or a switch 1150 disposed atop thereof. The button or the switch 1150 can power on or power off the applicator unit 1400.

The fire-proof wall 1335 can be disposed between the fuel combustion heating unit 1505 and the hand grip 1110, thereby protecting the user of the applicator unit 1400 from being burned. The safety lever 1115 can activate the fuel combustion heating unit 1505 when squeezed to the hand grip 1110. The safety lever 1115 can deactivate the fuel combustion heating unit 1505 when not squeezed to the hand grip 1110. The default or at-rest position of the safety lever 1115 can be the not-squeezed position. The hand grip 1110 can include a safety lever notch 1330 within a lower region of the hand grip 1110. The safety lever 1115 can fit within the safety lever notch 1330 and be flush with a lower surface 1510 of the hand grip 1110 when squeezed to the hand grip 1110.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

Embodiments are described herein, and illustrated in the drawings, in terms of functional blocks, units and/or modules. Those skilled in the art will appreciate that these blocks, units and/or modules can be physically implemented by electronic circuits such as logic circuits, discrete components, microprocessors, hard-wired circuits, memory elements, wiring connections, and the like. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Embodiments of the inventive concept can be described by reference to or in conjunction with associated data including functions, procedures, data structures, application programs, etc. which when accessed by a machine results in the machine performing tasks or defining abstract data types or low-level hardware contexts.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A portable all-in-one hand-held fuel-based organic entity termination applicator unit, comprising:
    a chamber coupled with a water line and configured to store an organic herbicide, the chamber being configured to introduce the organic herbicide from the chamber to a liquid in the water line;
    a fuel combustion heating unit coupled with the water line, the fuel combustion heating unit being configured to heat the liquid to create a heated liquid;
    a fuel canister receptacle, wherein the fuel combustion heating unit is configured to heat the liquid using fuel stored in a fuel canister when the fuel canister is seated within the receptacle;
    a spray tip coupled with the fuel combustion heating unit and configured to expel the heated liquid in a jet of liquid from the applicator unit;
    an applicator body including a hand grip, wherein the chamber and a pump are housed within an interior of the applicator body;
    a delivery pipe including a first terminal end and an opposed second end; and
    wherein:
    the delivery pipe is coupled to the fuel combustion heating unit;
    the delivery pipe includes a single hollow housing;
    the first terminal end of the delivery pipe is a terminal end of the single hollow housing;
    the spray tip is coupled to the first terminal end of the delivery pipe;
    the water line extends through the single hollow housing of the delivery pipe from the second end of the delivery pipe to the spray tip at the first terminal end of the delivery pipe;
    the spray tip is directly coupled to the terminal end of the single hollow housing; and
    the pump and the fuel combustion heating unit are configured to expel the heated liquid through the hollow housing of the delivery pipe and through the spray tip at the terminal end of the single hollow housing.

2. The portable all-in-one hand-held fuel-based organic entity termination applicator unit of claim 1, further comprising a pump coupled with the water line and configured to pressurize the liquid in the water line, the liquid including the organic herbicide, wherein:
    the pump is configured to pressurize the liquid in the water line to a pressure of between 30 and 500 pounds per square inch;
    the fuel combustion heating unit is configured to expel the heated liquid through the delivery pipe; and
    the delivery pipe is configured to expel the heated liquid through the spray tip in the form of a single jet of liquid.

3. The portable all-in-one hand-held fuel-based organic entity termination applicator unit of claim 2, wherein:
    the pump is configured to pressurize the liquid in the water line to a pressure of from 30 to 250 pounds per square inch; and
    the delivery pipe is directable by movement of the hand grip such that the spray tip and the single jet of liquid are directable.

4. The portable all-in-one hand-held fuel-based organic entity termination applicator unit of claim 1, wherein:
    the fuel combustion heating unit is configured to heat the heated liquid to a temperature of at least 165 degrees Fahrenheit; and
    the spray tip is configured to expel the heated liquid as a stream of liquid rather than steam to burst cells on a surface of a plant, and to penetrate, by the heated liquid, deeper into layers of the plant.

5. The portable all-in-one hand-held fuel-based organic entity termination applicator unit of claim 1, wherein the fuel combustion heating unit is positioned between the chamber and the spray tip, and wherein the spray tip is configured to spray the heated liquid in a conically shaped spray.

6. The portable all-in-one hand-held fuel-based organic entity termination applicator unit of claim 1, further comprising a water supply line directly connected to the pump, wherein:
    the chamber is coupled to the pump via a first section of the water line and via a valve, and the valve is configured to have an open position and a closed position;
    the valve is disposed in the first section of the water line between the chamber and the pump;
    the fuel combustion heating unit is coupled to the chamber via a second section of the water line;
    the chamber receives the pressurized liquid when the valve has the open position;
    the pump is configured to pressurize the liquid in the water line to a pressure of between 30 and 500 pounds per square inch;
    the spray tip is coupled to the first terminal end of the delivery pipe;
    the delivery pipe includes a downward bend to direct the jet of liquid toward one or more leaves, stems, branches, or a trunk of a plant;
    the fuel combustion heating unit is configured to expel the heated liquid through the delivery pipe; and
    the delivery pipe is configured to expel the heated liquid through the spray tip in the form of a single jet of liquid.

7. The portable all-in-one hand-held fuel-based organic entity termination applicator unit of claim 6, further comprising an electrical line coupled to a safety lever, wherein:
    the chamber is configured to introduce the organic herbicide into the liquid in the water line such that the liquid includes water and the organic herbicide when the valve is in the open position;
    the safety lever is disposed beneath the hand grip; and
    the safety lever is configured to activate and deactivate the fuel combustion heating unit.

8. The portable all-in-one hand-held fuel-based organic entity termination applicator unit of claim 6, wherein the valve is further configured to have a partially open position.

9. The portable all-in-one hand-held fuel-based organic entity termination applicator unit of claim 1, further comprising an electric power line connector configured to connect an electric power line to the applicator body.

10. The portable all-in-one hand-held fuel-based organic entity termination applicator unit of claim 6, further comprising at least one of a button or a switch disposed atop the hand grip.

11. The portable all-in-one hand-held fuel-based organic entity termination applicator unit of claim 10, wherein the at least one of the button or the switch is configured to at least one of power on or power off the applicator unit.

12. The portable all-in-one hand-held fuel-based organic entity termination applicator unit of claim 1, further comprising a fire-proof wall disposed between the fuel combustion heating unit and the hand grip.

13. The portable all-in-one hand-held fuel-based organic entity termination applicator unit of claim 1, wherein the valve is a solenoid valve.

14. The portable all-in-one hand-held fuel-based organic entity termination applicator unit of claim 1, further comprising a safety lever disposed beneath the hand grip, wherein:
the safety lever is configured to activate the fuel combustion heating unit when squeezed to the hand grip; and
the safety lever is configured to deactivate the fuel combustion heating unit when not squeezed to the hand grip.

15. The portable all-in-one hand-held fuel-based organic entity termination applicator unit of claim 14, further comprising a safety lever notch within a lower region of the hand grip, wherein the safety lever is configured to fit within the safety lever notch and be flush with a lower surface of the hand grip when squeezed to the hand grip.

16. The portable all-in-one hand-held fuel-based organic entity termination applicator unit of claim 1, wherein the fuel canister receptacle is configured to receive a propane tank, and the fuel combustion heating unit is configured to heat the liquid using propane stored in the propane tank seated within the receptacle.

17. A portable all-in-one hand-held fuel-based organic entity termination applicator unit comprising:
a housing including a hand grip adapted to be gripped by a human operator of the applicator unit;
a chamber positioned within the housing and coupled with a water line, at least a portion of the water line positioned within the housing, the chamber being configured to store an organic herbicide and to introduce the organic herbicide from the chamber to a liquid in the water line;
a fuel combustion heating unit coupled with the water line, the fuel combustion heating unit being configured to heat the liquid to create a heated liquid;
a fuel canister receptacle, wherein the fuel combustion heating unit is configured to heat the liquid using fuel stored in a fuel canister seated within the receptacle;
a spray tip coupled with the fuel combustion heating unit and configured to expel the heated liquid in a jet of liquid from the applicator; and
a delivery pipe including a first terminal end and an opposed second end, the spray tip being coupled to the delivery pipe, the water line extending from the housing to the delivery pipe, and the fuel combustion heating unit positioned within one of the housing and the delivery pipe,
wherein:
the housing is directly coupled to the second end of the delivery pipe;
the delivery pipe is coupled to the fuel combustion heating unit;
the delivery pipe includes a single hollow housing;
the first terminal end of the delivery pipe is a terminal end of the single hollow housing;
the spray tip is coupled to the first terminal end of the delivery pipe;
the water line extends through the single hollow housing of the delivery pipe from the second end of the delivery pipe to the spray tip at the first terminal end of the delivery pipe;
the spray tip is directly coupled to the terminal end of the single hollow housing; and
the heated liquid is configured to be expelled through the hollow housing of the delivery pipe and through the spray tip at the terminal end of the single hollow housing.

18. The portable all-in-one hand-held fuel-based organic entity termination applicator unit of claim 17, further comprising:
a pump positioned within the housing and coupled with the water line, the pump being configured to pressurize the liquid in the water line, the liquid including the organic herbicide; and
a water supply line directly connected to the pump, wherein:
the chamber is coupled to the pump via a first section of the water line and via a valve, and the valve is configured to have an open position and a closed position;
the valve is disposed in the first section of the water line between the chamber and the pump;
the fuel combustion heating unit is coupled to the chamber via a second section of the water line;
the chamber receives the pressurized liquid when the valve has the open position;
the pump is configured to pressurize the liquid in the water line to a pressure of between 30 and 500 pounds per square inch;
the spray tip is directly coupled to the first terminal end of the delivery pipe;
the delivery pipe includes a downward bend to direct the jet of liquid toward one or more leaves, stems, branches, or a trunk of a plant;
the fuel combustion heating unit is configured to expel the heated liquid through the delivery pipe; and
the delivery pipe is configured to expel the heated liquid through the spray tip in the form of a single jet of liquid.

19. A portable organic entity termination applicator unit, comprising:
a chamber coupled with a water line and configured to store a substance, the chamber being configured to introduce the substance from the chamber to a liquid in the water line;
a fuel combustion heating unit coupled with the water line, the fuel combustion heating unit being configured to heat the liquid to create a heated liquid;
a fuel canister receptacle, wherein the fuel combustion heating unit is configured to heat the liquid using fuel stored in a fuel canister when the fuel canister is seated within the receptacle;

a spray tip coupled with the fuel combustion heating unit and configured to expel the heated liquid in a jet of liquid from the applicator unit;

an applicator body including a hand grip, wherein the chamber and a pump are housed within an interior of the applicator body;

a delivery pipe including a first terminal end and an opposed second end; and wherein:

the delivery pipe is coupled to the fuel combustion heating unit;

the delivery pipe includes a single hollow housing;

the first terminal end of the delivery pipe is a terminal end of the single hollow housing;

the spray tip is coupled to the first terminal end of the delivery pipe;

the water line extends through the single hollow housing of the delivery pipe from the second end of the delivery pipe to the spray tip at the first terminal end of the delivery pipe;

the spray tip is directly coupled to the terminal end of the single hollow housing; and the pump and the fuel combustion heating unit are configured to expel the heated liquid through the hollow housing of the delivery pipe and through the spray tip at the terminal end of the single hollow housing.

* * * * *